US012581425B2

(12) United States Patent
Wang et al.

(10) Patent No.: US 12,581,425 B2
(45) Date of Patent: Mar. 17, 2026

(54) SIDELINK DATA TRANSMISSION METHOD AND RELATED APPARATUS

(71) Applicant: Huawei Technologies Co., Ltd., Shenzhen (CN)

(72) Inventors: Bichai Wang, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 336 days.

(21) Appl. No.: 18/036,070

(22) PCT Filed: Nov. 10, 2021

(86) PCT No.: PCT/CN2021/129750
§ 371 (c)(1),
(2) Date: May 9, 2023

(87) PCT Pub. No.: WO2022/100605
PCT Pub. Date: May 19, 2022

(65) Prior Publication Data
US 2023/0413186 A1      Dec. 21, 2023

(30) Foreign Application Priority Data

Nov. 10, 2020    (CN) ......................... 202011247043.1
Dec. 29, 2020    (CN) ......................... 202011603242.1

(51) Int. Cl.
*H04W 52/24*          (2009.01)
*H04W 52/38*          (2009.01)
(52) U.S. Cl.
CPC ....... *H04W 52/241* (2013.01); *H04W 52/383* (2013.01)

(58) Field of Classification Search
CPC ............. H04W 52/241; H04W 52/383; H04W 52/247; H04W 52/243; H04W 52/367;
(Continued)

(56) References Cited

U.S. PATENT DOCUMENTS 10,841,914 B2 * 11/2020 Liou ..................... H04L 5/0094
2012/0281555 A1 * 11/2012 Gao ....................... H04L 5/0035
                                                                            370/252
(Continued)

FOREIGN PATENT DOCUMENTS

CN          111107618 A      5/2020

OTHER PUBLICATIONS

European search opinion dated Jun. 4, 2024 for EP 21891125. (Year: 2024).*
(Continued)

*Primary Examiner* — Juan A Torres
(74) *Attorney, Agent, or Firm* — Slater Matsil, LLP

(57)          ABSTRACT
A first transmitting terminal sends a first channel state information-reference signal CSI-RS in N frequency domain units, where N is a positive integer. The first transmitting terminal detects channel state information CSI sent by K receiving terminals, where the CSI sent by the K receiving terminals is determined based on the first CSI-RS, and K is a positive integer. The first transmitting terminal updates a transmit power of the first transmitting terminal in the N frequency domain units based on the CSI sent by the K receiving terminals. When updated powers of F frequency domain units in the N frequency domain units are greater than a preset threshold, the first transmitting terminal sends user data in at least one of the F frequency domain units, where F is a positive integer less than or equal to N.

20 Claims, 22 Drawing Sheets

(58) Field of Classification Search
CPC ... H04L 5/0044; H04L 5/0007; H04L 5/0094;
H04L 5/0048; H04L 5/0053
USPC ........................................................ 455/522
See application file for complete search history.

(56)                    References Cited

U.S. PATENT DOCUMENTS

2017/0332359 A1*  11/2017  Tsai ...................... H04W 68/02
2022/0109546 A1*  4/2022  Panteleev ............. H04L 5/0053
2022/0131676 A1*  4/2022  Zhang .................... H04L 5/001

OTHER PUBLICATIONS

Amendments received before examination dated Dec. 5, 2024 for EP 21891125. (Year: 2024).*
Amended claims filed after receipt of (European) search report dated Dec. 5, 2024 for EP 21891125. (Year: 2024).*
3GPP TSG RAN WG1 Meeting #97, "Sidelink physical layer procedures for NR V2X" Huawei, HiSilicon, R1-1906008, Reno, USA, May 13-17, 2019, 24 pages.

* cited by examiner

Communication system 100

105

Sidelink 1

101

102

Interference

Sidelink 2

103

104

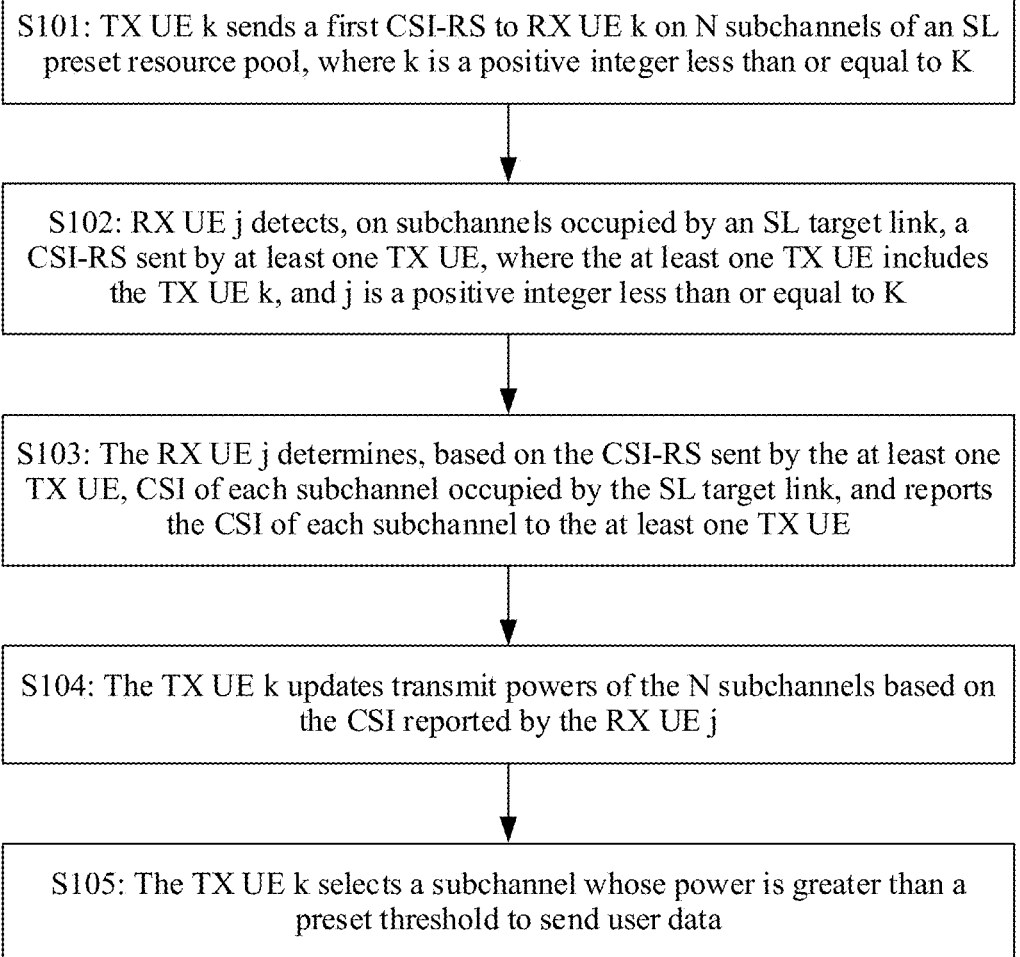

S101: TX UE k sends a first CSI-RS to RX UE k on N subchannels of an SL preset resource pool, where k is a positive integer less than or equal to K S102: RX UE j detects, on subchannels occupied by an SL target link, a CSI-RS sent by at least one TX UE, where the at least one TX UE includes the TX UE k, and j is a positive integer less than or equal to K S103: The RX UE j determines, based on the CSI-RS sent by the at least one TX UE, CSI of each subchannel occupied by the SL target link, and reports the CSI of each subchannel to the at least one TX UE S104: The TX UE k updates transmit powers of the N subchannels based on the CSI reported by the RX UE j S105: The TX UE k selects a subchannel whose power is greater than a preset threshold to send user data

FIG. 6

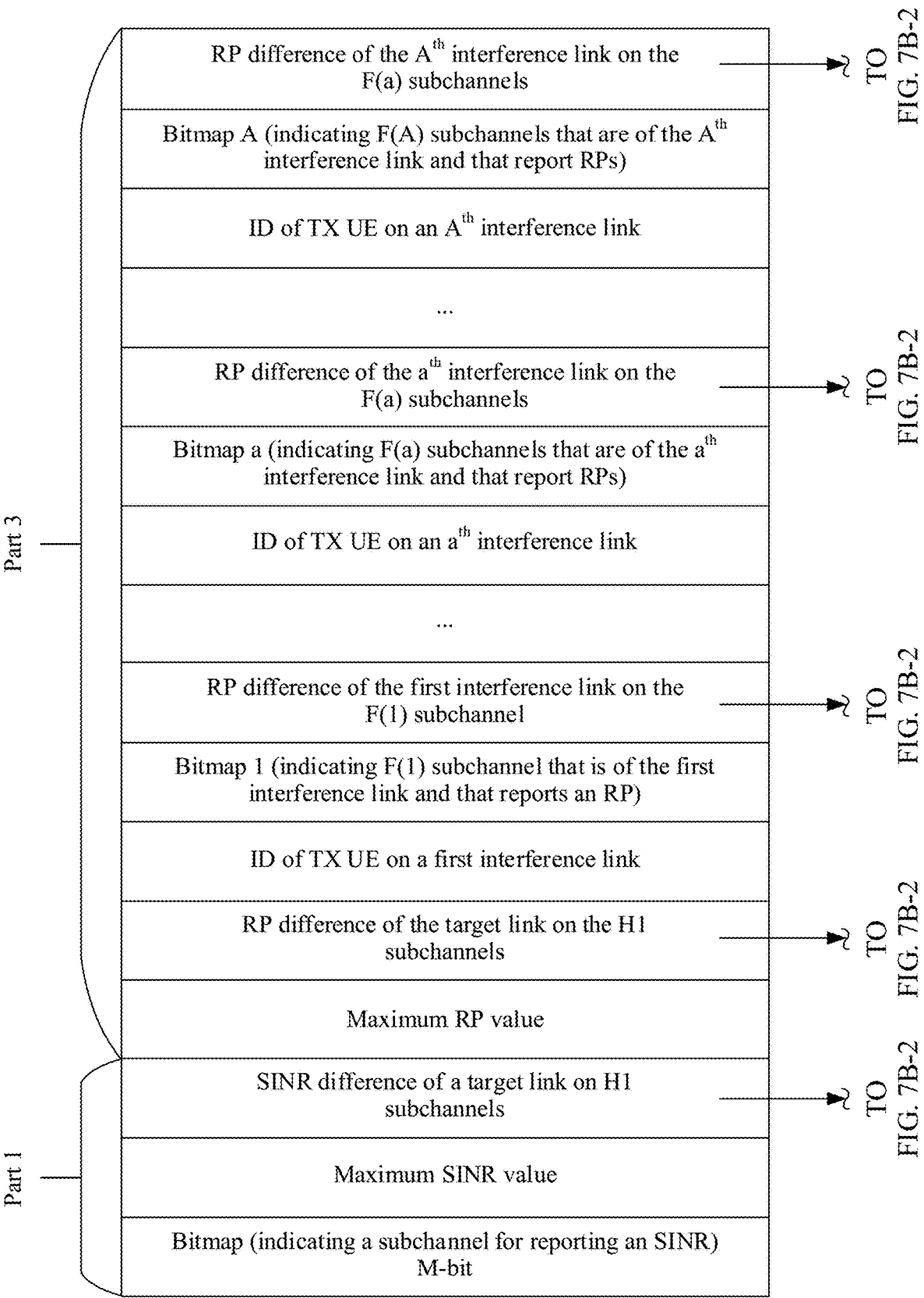

Part 3

RP difference of the A$^{th}$ interference link on the F(a) subchannels — TO FIG. 7B-2

Bitmap A (indicating F(A) subchannels that are of the A$^{th}$ interference link and that report RPs)

ID of TX UE on an A$^{th}$ interference link

...

RP difference of the a$^{th}$ interference link on the F(a) subchannels — TO FIG. 7B-2

Bitmap a (indicating F(a) subchannels that are of the a$^{th}$ interference link and that report RPs)

ID of TX UE on an a$^{th}$ interference link

...

RP difference of the first interference link on the F(1) subchannel — TO FIG. 7B-2

Bitmap 1 (indicating F(1) subchannel that is of the first interference link and that reports an RP)

ID of TX UE on a first interference link

RP difference of the target link on the H1 subchannels — TO FIG. 7B-2

Maximum RP value

Part 1

SINR difference of a target link on H1 subchannels — TO FIG. 7B-2

Maximum SINR value

Bitmap (indicating a subchannel for reporting an SINR) M-bit

FIG. 7B-1

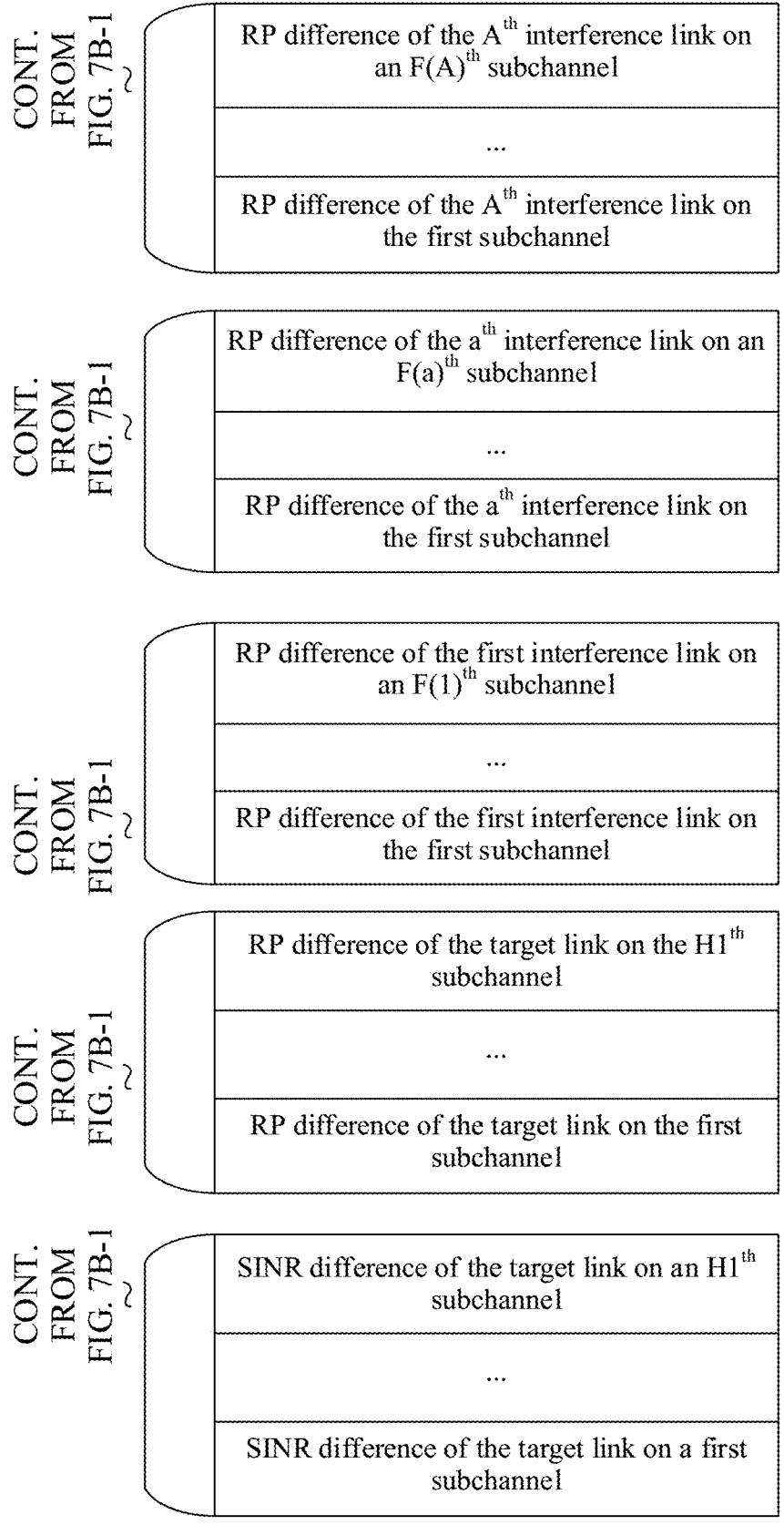

CONT. FROM FIG. 7B-1

RP difference of the A<sup>th</sup> interference link on an F(A)<sup>th</sup> subchannel

...

RP difference of the A<sup>th</sup> interference link on the first subchannel

CONT. FROM FIG. 7B-1

RP difference of the a<sup>th</sup> interference link on an F(a)<sup>th</sup> subchannel

...

RP difference of the a<sup>th</sup> interference link on the first subchannel

CONT. FROM FIG. 7B-1

RP difference of the first interference link on an F(1)<sup>th</sup> subchannel

...

RP difference of the first interference link on the first subchannel

CONT. FROM FIG. 7B-1

RP difference of the target link on the H1<sup>th</sup> subchannel

...

RP difference of the target link on the first subchannel

CONT. FROM FIG. 7B-1

SINR difference of the target link on an H1<sup>th</sup> subchannel

...

SINR difference of the target link on a first subchannel

FIG. 7B-2

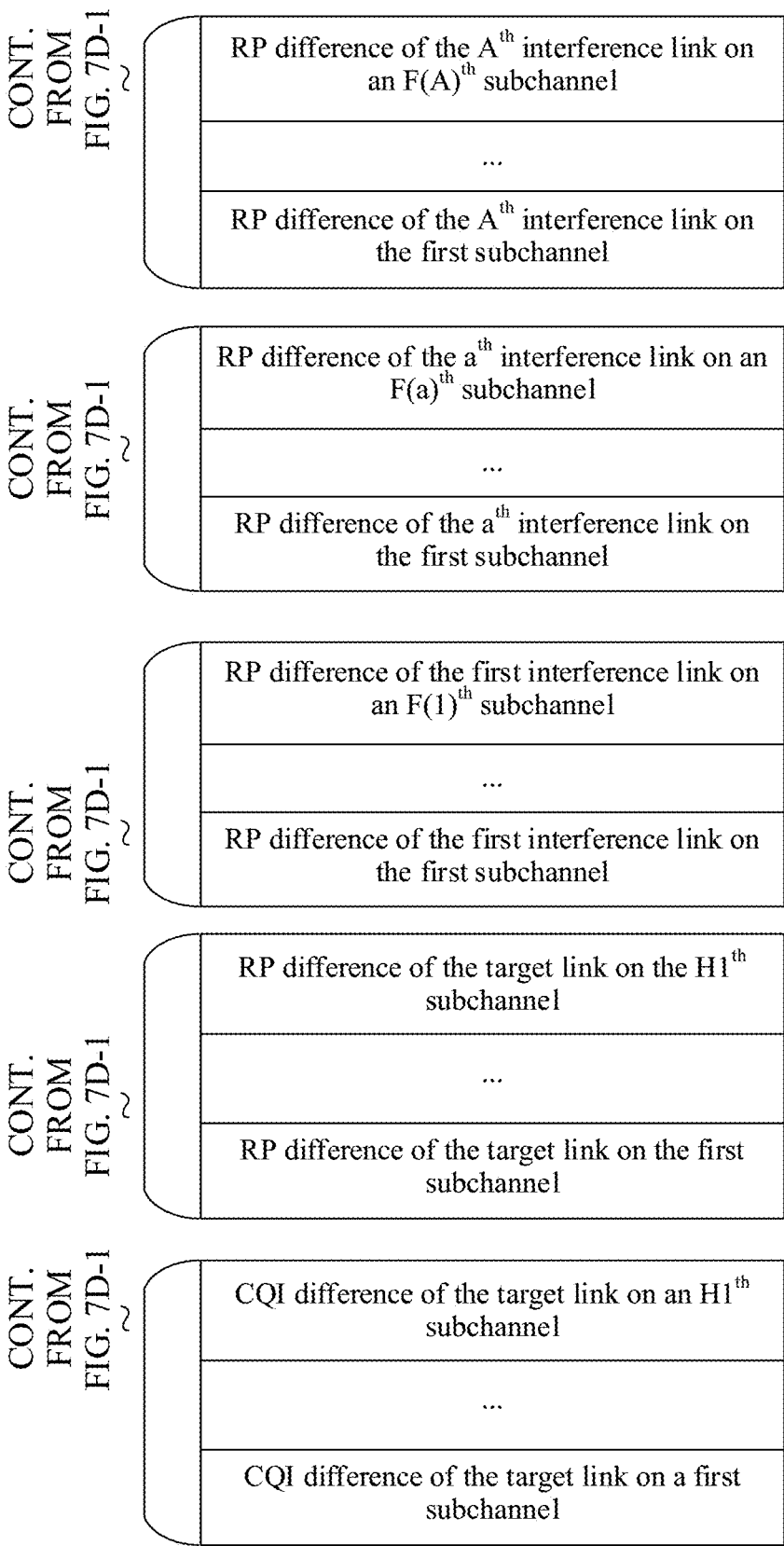

CONT. FROM FIG.7D-1

RP difference of the A$^{th}$ interference link on an F(A)$^{th}$ subchannel

...

RP difference of the A$^{th}$ interference link on the first subchannel

CONT. FROM FIG.7D-1

RP difference of the a$^{th}$ interference link on an F(a)$^{th}$ subchannel

...

RP difference of the a$^{th}$ interference link on the first subchannel

CONT. FROM FIG.7D-1

RP difference of the first interference link on an F(1)$^{th}$ subchannel

...

RP difference of the first interference link on the first subchannel

CONT. FROM FIG.7D-1

RP difference of the target link on the H1$^{th}$ subchannel

...

RP difference of the target link on the first subchannel

CONT. FROM FIG.7D-1

CQI difference of the target link on an H1$^{th}$ subchannel

...

CQI difference of the target link on a first subchannel

FIG. 7D-2

Part 1

SIDELINK DATA TRANSMISSION METHOD AND RELATED APPARATUS

CROSS-REFERENCE TO RELATED APPLICATIONS

This application is a national stage of International Application No. PCT/CN2021/129750, filed Nov. 10, 2021, which claims priority to Chinese Patent Application No. 202011247043.1, filed on Nov. 10, 2020, and Chinese Patent Application No. 202011603242.1, filed Dec. 29, 2020. All the aforementioned applications are hereby incorporated by reference in their entireties.

TECHNICAL FIELD

This application relates to the field of electronic technologies, and in particular, to a sidelink data transmission method and a related apparatus.

BACKGROUND

Sidelink (Sidelink, SL) communication supports direct communication between user equipments (User Equipment, UE), including device to device (device to-device, D2D) communication, vehicle-to-everything (Vehicle-to-Everything, V2X) communication, and the like. There are two resource allocation patterns in an SL: a network control pattern, that is, an SL communication resource is scheduled by a base station; and a distributed pattern, that is, UE spontaneously selects an SL communication resource from a preconfigured SL resource pool. In the distributed resource allocation pattern in the SL, when transmitting UE (Transmitting UE, TX UE) needs to send data to receiving UE (Receiving UE, RX UE), a time-frequency resource used for transmission needs to be selected from a resource pool through resource sensing (Resource Sensing), to maximally prevent different TX UEs from selecting a same time-frequency resource.

Currently, in a resource sensing process, the TX UE may measure interference between the TX UE and another TX UE, and select, for transmission, a resource that is not occupied by the another TX UE or that is occupied by the another TX UE but whose interference is less than a threshold. However, a resource selection criterion based only on interference intensity cannot ensure successful decoding of the RX UE and cannot achieve optimal system performance.

SUMMARY

Embodiments of this application provide a sidelink data transmission method and a related apparatus, to improve resource utilization through distributed power control and effectively improve system performance.

According to a first aspect, this application provides a sidelink data transmission method, including the following. A first transmitting terminal sends a first channel state information-reference signal (channel state information-reference signal, CSI-RS) in N frequency domain units, where N is a positive integer. The first transmitting terminal detects channel state information (channel state information, CSI) sent by K receiving terminals, where the CSI sent by the K receiving terminals is determined based on the first CSI-RS, and K is greater than or equal to 2. The first transmitting terminal updates a transmit power of the first transmitting terminal in the N frequency domain units based on all or some of the CSI sent by the K receiving terminals. The first transmitting terminal sends user data based on updated transmit powers of the N frequency domain units.

According to the method described in the first aspect, the first transmitting terminal updates a transmit power of each frequency domain unit through distributed power control based on the CSI measured and reported by the K receiving terminals. In this way, resource reuse of a data channel between a plurality of sidelink transmission pairs is implemented, resource utilization in a distributed resource allocation pattern is improved, and spectrum efficiency is effectively improved.

With reference to a possible implementation of the first aspect, the frequency domain unit may be a subchannel or a subband.

With reference to a possible implementation of the first aspect, that the first transmitting terminal sends user data based on updated transmit powers of the N frequency domain units includes: When updated powers of F frequency domain units in the N frequency domain units are greater than a preset threshold, the first transmitting terminal sends user data in at least one of the F frequency domain units, where F is a positive integer less than or equal to N.

With reference to a possible implementation of the first aspect, that a first transmitting terminal sends a first channel state information-reference signal CSI-RS in N frequency domain units includes: The first transmitting terminal sends first indication information and the first CSI-RS in the N frequency domain units, where the first indication information indicates a time-frequency resource location of the first CSI-RS.

With reference to a possible implementation of the first aspect, that a first transmitting terminal sends a first channel state information-reference signal CSI-RS in N frequency domain units includes: The first transmitting terminal sends the first CSI-RS in the N frequency domain units according to a predefined rule, where the predefined rule indicates a time-frequency resource location of the first CSI-RS.

With reference to a possible implementation of the first aspect, the first indication information is a preset field in first sidelink control information (sidelink control information, SCI).

With reference to a possible implementation of the first aspect, the first transmitting terminal sends the first indication information in the N frequency domain units in a broadcast manner.

With reference to a possible implementation of the first aspect, the first indication information is a radio resource control RRC higher layer signaling parameter.

With reference to a possible implementation of the first aspect, the first CSI-RS is sent periodically, and the first indication information further indicates a transmission periodicity of the first CSI-RS.

With reference to a possible implementation of the first aspect, the first CSI-RS is sent periodically, and the predefined rule further indicates a transmission periodicity of the first CSI-RS.

With reference to a possible implementation of the first aspect, that the first transmitting terminal detects CSI sent by K receiving terminals includes: The first transmitting terminal detects second indication information sent by a $j^{th}$ receiving terminal in the K receiving terminals, where the second indication information is used to indicate that the $j^{th}$ receiving terminal has reported CSI, and j is a positive integer less than or equal to K; and the first transmitting terminal detects, based on the second indication information, first CSI from received data sent by the $j^{th}$ receiving terminal.

With reference to a possible implementation of the first aspect, the second indication information is a preset field in second SCI sent by the $j^{th}$ receiving terminal; or the second indication information is a service identity (Identity, ID) that is reported in CSI and that is configured at a media access control (media access control, MAC) layer.

With reference to a possible implementation of the first aspect, the second indication information is a destination Layer-2 ID.

With reference to a possible implementation of the first aspect, the first CSI includes third indication information, and the third indication information is used to indicate a frequency domain unit corresponding to the first CSI reported by the $j^{th}$ receiving terminal.

With reference to a possible implementation of the first aspect, that the first transmitting terminal sends user data in at least one of the F frequency domain units includes: The first transmitting terminal sends first user data and fourth indication information in the at least one of the F frequency domain units, where the fourth indication information is used to indicate the at least one frequency domain unit in which the first transmitting terminal sends the user data, and when a quantity of frequency domain units of the at least one frequency domain unit is greater than 1, any two of the at least one frequency domain unit are consecutive or inconsecutive in frequency domain.

With reference to a possible implementation of the first aspect, the first receiving terminal reports the first CSI of a first frequency domain unit in at least one of a unicast manner, a multicast manner, and a broadcast manner.

With reference to a possible implementation of the first aspect, the CSI sent by the K receiving terminal includes the first CSI sent by the $j^{th}$ receiving terminal in the K receiving terminals. The first CSI includes at least one of the following items: a signal to interference plus noise ratio (signal to interference plus noise ratio, SINR) of the $j^{th}$ receiving terminal in H1 frequency domain units in frequency domain units occupied by a target link of the $j^{th}$ receiving terminal, and an interference to signal ratio (interference to signal ratio, ISR) that is received in h frequency domain units of the H1 frequency domain units and that is of an interference received power (received power, RP) of the first transmitting terminal to a signal RP of a target transmitting terminal, where H1 is greater than or equal to 1, and h is greater than or equal to 1 and less than or equal to H1.

With reference to a possible implementation of the first aspect, the CSI sent by the K receiving terminal includes the first CSI sent by the $j^{th}$ receiving terminal in the K receiving terminals. The first CSI includes at least one of the following items: a channel quality indicator (channel quality indicator, CQI) of the $j^{th}$ receiving terminal in H1 frequency domain units in frequency domain units occupied by a target link of the $j^{th}$ receiving terminal, and an ISR that is received in h frequency domain units of the H1 frequency domain units and that is of an interference RP of the first transmitting terminal to a signal RP of a target transmitting terminal, where H1 is greater than or equal to 1, and h is greater than or equal to 1 and less than or equal to H1.

With reference to a possible implementation of the first aspect, the CSI sent by the K receiving terminal includes the first CSI sent by the $j^{th}$ receiving terminal in the K receiving terminals. The first CSI includes at least one of the following items: SINR of the $j^{th}$ receiving terminal in H1 frequency domain units in frequency domain units occupied by a target link of the $j^{th}$ receiving terminal, an interference RP that is of the first transmitting terminal and that is received in h frequency domain units of the H1 frequency domain units, and a signal RP that is of a target transmitting terminal and that is received in the H1 frequency domain units, where H1 is greater than or equal to 1, and h is greater than or equal to 1 and less than or equal to H1.

With reference to a possible implementation of the first aspect, the CSI sent by the K receiving terminal includes the first CSI sent by the $j^{th}$ receiving terminal in the K receiving terminals. The first CSI includes at least one of the following items: a CQI of the $j^{th}$ receiving terminal in H1 frequency domain units in frequency domain units occupied by a target link of the $j^{th}$ receiving terminal, an interference RP that is of the first transmitting terminal and that is received in h frequency domain units of the H1 frequency domain units, and a signal RP that is of a target transmitting terminal and that is received in the H1 frequency domain units, where H1 is greater than or equal to 1, and h is greater than or equal to 1 and less than or equal to H1.

With reference to a possible implementation of the first aspect, the $j^{th}$ receiving terminal in the K receiving terminals is a target receiving terminal of an SL of a $j^{th}$ transmitting terminal in K transmitting terminals, the first transmitting terminal is a $k^{th}$ transmitting terminal in the K transmitting terminals, k and j are positive integers less than or equal to K, and n is a positive integer less than or equal to N. A relationship between an updated transmit power of the $k^{th}$ transmitting terminal in an $n^{th}$ frequency domain unit and the CSI reported by the K receiving terminals may be represented as follows:

$$\sqrt{p_k^{(t+1)}[n]} = \frac{SINR_k^{(t)}[n]/\sqrt{p_k^{(t)}[n]}}{\dfrac{1}{p_k^{(t)}[n]}\sum_{j=1}^{K} ISR_{kj}^{(t)}[n] * \dfrac{\left(SINR_j^{(t)}[n]\right)^2}{1 + SINR_j^{(t)}[n]} + \lambda_k^{(t+1)}}, \text{ where}$$

$p_k^{(t+1)}[n]$ represents the updated transmit power of the $k^{th}$ transmitting terminal in the $n^{th}$ frequency domain unit; $p_k^{(t)}[n]$ represents an un-updated transmit power of the $k^{th}$ transmitting terminal in the $n^{th}$ frequency domain unit; $SINR_j^{(t)}[n]$ represents an SINR of the $j^{th}$ receiving terminal in the $n^{th}$ frequency domain unit; $ISR_k^{(t)}[n]$ represents an interference to signal ISR that is received in the $n^{th}$ frequency domain unit and that is of an interference RP of the $k^{th}$ transmitting terminal to a signal RP of the $j^{th}$ transmitting terminal; $\lambda_k^{(t+1)}$ is an optimization parameter that enables a transmit power of the $k^{th}$ transmitting terminal in the N frequency domain units to meet $\sum_{n=1}^{N} p_k^{(t+1)}[n] \leq P_{max}$; $P_{max}$ is a maximum transmit power of the $k^{th}$ transmitting terminal; and $\lambda_k^{(t+1)} \geq 0$.

With reference to a possible implementation of the first aspect, the $j^{th}$ receiving terminal in the K receiving terminals is a target receiving terminal of an SL of a $j^{th}$ transmitting terminal in K transmitting terminals, the first transmitting terminal is a $k^{th}$ transmitting terminal in the K transmitting terminals, k and j are positive integers less than or equal to K, and n is a positive integer less than or equal to N. A relationship between an updated transmit power of the $k^{th}$ transmitting terminal in an $n^{th}$ frequency domain unit and the CSI reported by the K receiving terminals may be represented as follows:

$$\sqrt{p_k^{(t+1)}[n]} = \frac{SINR_k^{(t)}[n]/\sqrt{RP_{kk}^{(t)}[n]}}{\sum_{j=1}^{K} \dfrac{RP_{kj}^{(t)}[n]}{RP_{jj}^{(t)}[n] * p_k[n]} * \dfrac{\left(SINR_j^{(t)}[n]\right)^2}{1 + SINR_j^{(t)}[n]} + \lambda_k^{(t+1)}}, \text{ where}$$

$p_k^{(t+1)}[n]$ represents the updated transmit power of the $k^{th}$ transmitting terminal in the $n^{th}$ frequency domain unit; $p_k^{(t)}[n]$ represents an un-updated transmit power of the $k^{th}$ transmitting terminal in the $n^{th}$ frequency domain unit; $SINR_j^{(t)}[n]$ represents an SINR of the $j^{th}$ receiving terminal in the $n^{th}$ frequency domain unit; $RP_{kj}^{(t)}[n]$ represents an interference RP that is sent by the $k^{th}$ transmitting terminal and that is received by the $j^{th}$ receiving terminal in the $n^{th}$ frequency unit, where $j\neq k$; $RP_{jj}^{(t)}[n]$ represents a signal RP that is of the $j^{th}$ transmitting terminal and that is received in the $n^{th}$ frequency unit; $\lambda_k^{(t+1)}$ is an optimization parameter that enables a transmit power of the $k^{th}$ transmitting terminal in the N frequency domain units to meet $\Sigma_{n=1}^{N} p_k^{(t+1)}[n]$ $\leq P_{max}$; $P_{max}$ is a maximum transmit power of the $k^{th}$ transmitting terminal; and $\lambda_k^{(t+1)} \geq 0$.

With reference to a possible implementation of the first aspect, before a first transmitting terminal sends a first channel state information-reference signal CSI-RS in N frequency domain units, the method further includes: The first transmitting terminal detects signal energy of each of M frequency domain units in an SL preset resource pool, to determine the N frequency domain units whose signal energy is less than a preset value in the M frequency domain units, where M is a positive integer greater than or equal to N.

With reference to a possible implementation of the first aspect, that a first transmitting terminal sends a first channel state information-reference signal CSI-RS in N frequency domain units includes: The first transmitting terminal sends the first CSI-RS at an equal power in each of the N frequency domain units.

With reference to a possible implementation of the first aspect, that a first transmitting terminal sends a first channel state information-reference signal CSI-RS in N frequency domain units includes: The first transmitting terminal sends the first CSI-RS and user data at an equal power in each of the N frequency domain units.

According to a second aspect, this application provides a sidelink data transmission method, including the following. A first receiving terminal detects, in H1 frequency domain units in frequency domain units occupied by a target link, channel state information-reference signals CSI-RSs sent by L transmitting terminals, where L is greater than or equal to 2, and H1 is greater than or equal to 1. The first receiving terminal sends first CSI of the H1 frequency domain units based on the CSI-RSs sent by the L transmitting terminals, where the first CSI is used by the L transmitting terminals to update transmit powers of the H1 frequency domain units.

In this embodiment of this application, according to the method described in the second aspect, the first receiving terminal measures CSI of each frequency domain unit based on CSI-RSs sent by at least two transmitting terminals, and performs CSI reporting at a subchannel level (or a subband level), so that each transmitting terminal updates a transmit power of each frequency domain unit based on the CSI reported by the first receiving terminal. In this way, resource reuse of a data channel between a plurality of sidelink transmission pairs is implemented, resource utilization in a distributed resource allocation pattern is improved, and spectrum efficiency is effectively improved.

With reference to a possible implementation of the first aspect, the frequency domain unit may be a subchannel or a subband.

With reference to a possible implementation of the second aspect, the channel state information-reference signals CSI-RSs sent by the L transmitting terminals includes a first CSI-RS sent by a first transmitting terminal. That a first receiving terminal detects, in H1 frequency domain units in frequency domain units occupied by a target link, channel state information-reference signals CSI-RSs sent by L transmitting terminals includes: The first receiving terminal detects first indication information sent by the first transmitting terminal, where the first receiving terminal detects the first CSI-RS in h frequency domain units of the first H1 frequency domain units, and h is greater than or equal to 1 and less than or equal to H1.

With reference to a possible implementation of the second aspect, the channel state information-reference signals CSI-RSs sent by the L transmitting terminals includes a first CSI-RS sent by a first transmitting terminal. That a first receiving terminal detects, in H1 frequency domain units in frequency domain units occupied by a target link, channel state information-reference signals CSI-RSs sent by L transmitting terminals includes: The first receiving terminal detects, according to a predefined rule in h frequency domain units in the H1 frequency domain units, the first CSI-RS sent by the first transmitting terminal, where the predefined rule indicates a time-frequency resource location of the CSI-RS sent by the first transmitting terminal.

With reference to a possible implementation of the second aspect, the first indication information is a preset field in first sidelink control information SCI.

With reference to a possible implementation of the second aspect, the first indication information is a radio resource control RRC higher layer signaling parameter.

With reference to a possible implementation of the second aspect, the first CSI-RS is sent periodically, and the first indication information further indicates a transmission periodicity of the first CSI-RS.

With reference to a possible implementation of the second aspect, the first CSI-RS is sent periodically, and the predefined rule further indicates a transmission periodicity of the first CSI-RS.

With reference to a possible implementation of the second aspect, that the first receiving terminal sends first CSI of the H1 frequency domain units includes: The first receiving terminal sends second indication information and the first CSI of the H1 frequency domain units, where the second indication information is used to indicate that the first receiving terminal has reported the CSI.

With reference to a possible implementation of the second aspect, the second indication information is a preset field in second SCI sent by the first receiving terminal; or the second indication information is a service ID that is reported in CSI and that is configured at a media access control layer MAC layer.

With reference to a possible implementation of the second aspect, the second indication information is a destination Layer-2 ID.

With reference to a possible implementation of the second aspect, the first CSI includes at least one of the following items: a signal to interference plus noise ratio SINR of the first receiving terminal in the H1 frequency domain units, and an interference to signal ratio ISR that is received in the h frequency domain units and that is of an interference received power RP of the first transmitting terminal to a signal RP of a target transmitting terminal.

With reference to a possible implementation of the second aspect, the first CSI includes at least one of the following items: a channel quality indicator CQI of the first receiving terminal in the H1 frequency domain units, and an ISR that is received in the h frequency domain units and that is of an interference RP of the first transmitting terminal to a signal RP of a target transmitting terminal.

With reference to a possible implementation of the second aspect, the first CSI includes at least one of the following items: an SINR of the first receiving terminal in the H1 frequency domain units, an interference RP that is of the first transmitting terminal and that is received in the h frequency domain units, and a signal RP that is of a target transmitting terminal and that is received in the H1 frequency domain units.

With reference to a possible implementation of the second aspect, the first CSI includes at least one of the following items: a CQI of the first receiving terminal in the H1 frequency domain units, an interference RP that is of the first transmitting terminal and that is received in the at least one frequency domain unit, and a signal RP that is of a target transmitting terminal and that is received in the H1 frequency domain units.

According to a third aspect, this application provides an electronic device, including one or more processors and one or more memories. The one or more memories are coupled to the one or more processors, the one or more memories are configured to store computer program code, and the computer program code includes computer instructions. When the one or more processors execute the computer instructions, the electronic device is enabled to perform any possible implementation of the first aspect or the second aspect.

According to a fourth aspect, an embodiment of this application provides a computer storage medium, including computer instructions. When the computer instructions are run on an electronic device, the electronic device is enabled to perform any possible implementation of the first aspect or the second aspect.

According to a fifth aspect, an embodiment of this application provides a computer program product. When the computer program product runs on a computer, the computer is enabled to perform any possible implementation of the first aspect or the second aspect.

BRIEF DESCRIPTION OF THE DRAWINGS

FIG. 6 is a schematic flowchart of an SL data transmission method according to an embodiment of this application;

FIG. 7A-1 and FIG. 7A-2 are a schematic diagram of a CSI data structure in a content form 1 according to an embodiment of this application;

FIG. 7B-1 and FIG. 7B-2 are a schematic diagram of a CSI data structure in a content form 2 according to an embodiment of this application;

FIG. 7C-1 and FIG. 7C-2 are a schematic diagram of a CSI data structure in a content form 3 according to an embodiment of this application;

FIG. 7D-1 and FIG. 7D-2 are a schematic diagram of a CSI data structure in a content form 4 according to an embodiment of this application;

DETAILED DESCRIPTION OF ILLUSTRATIVE EMBODIMENTS

Figure 1A:
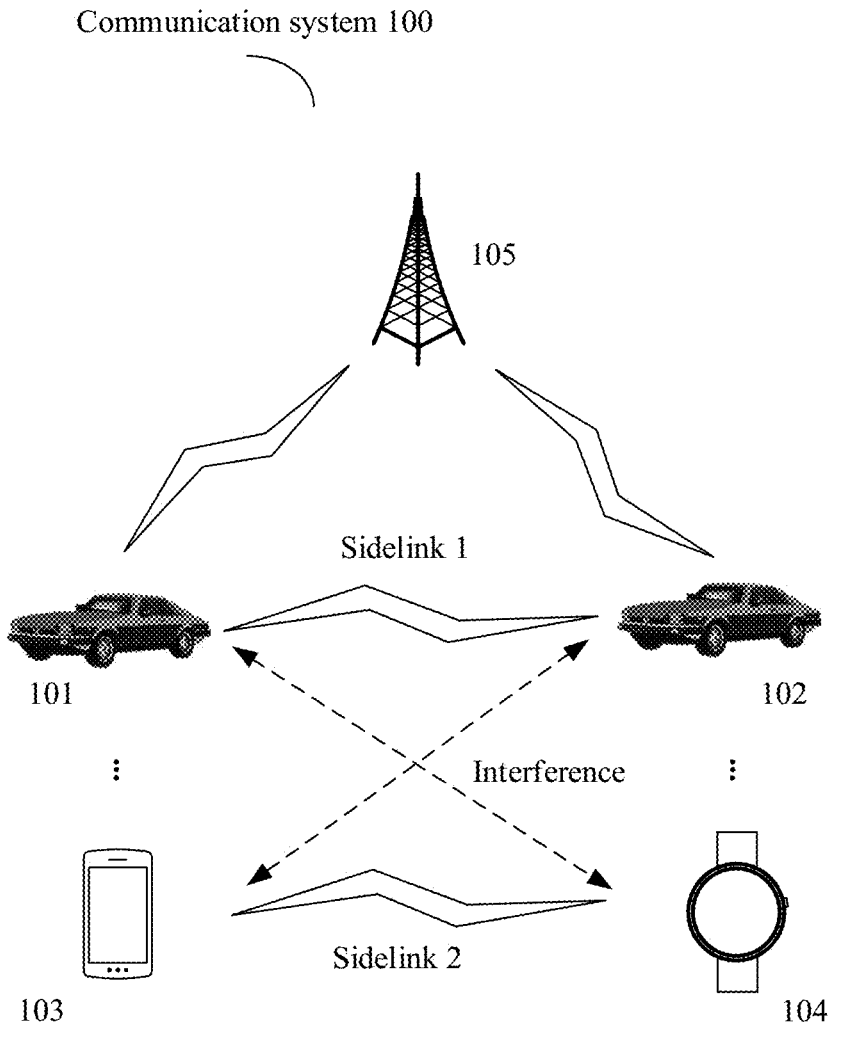
FIG. 1A is a schematic diagram of a structure of a communication system according to an embodiment of this application.

The following clearly describes technical solutions in embodiments of this application in detail with reference to accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more than two.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes related concepts in embodiments of this application.

Subcarrier: In an OFDM technology, orthogonality between subcarriers is used to combat multipath interference. According to an LTE protocol, in a case of a normal cyclic prefix (cyclic prefix, CP), one slot (slot) has seven OFDM symbols; and in a case of an extended CP, one slot has six OFDM symbols. According to a 5G new radio (New radio, NR) protocol, in a case of a normal CP, one slot (slot) has 14 OFDM symbols; and in a case of an extended CP, one slot has 12 OFDM symbols. 5G NR supports a plurality of subcarrier spacings (for example, 15 kHz, 30 kHz, and 60 kHz). Different subcarrier spacings indicate different slot lengths.

Resource block (resource block, RB): An RB is a resource unit for traffic channel resource allocation, and occupies 12 consecutive subcarriers in frequency domain.

Subchannel (subchannel): One subchannel includes several consecutive RBs in frequency domain, and a size of the subchannel may be configured or predefined by a network device. Subband (subband): A subband is a frequency domain granularity unit for channel information feedback at the physical layer. A system bandwidth may be divided into several subbands. For example, based on different system bandwidths, a size of a subband may be four RBs, six RBs, eight RBs, or the like. In this embodiment of this application, a subchannel and a subband may alternatively be referred to as frequency domain units.

CSI channel state information (Channel State Information, CSI) is information used to estimate a characteristic of a communication link, and a process of estimating the CSI is referred to as channel estimation. The CSI includes but is not limited to one or more of a precoding matrix indicator (precoding matrix indicator, PMI), a rank indicator (rank indicator, RI), a channel state information-reference signal (channel state information-reference signal, CSI-RS), a resource indicator (CSI-RS resource indicator, CRI), a precoding type indicator (precoding type indicator, PTI), and a channel quality indicator (Channel Quality Indicator, CQI). A time-frequency resource occupied by the CSI is controlled by a network device.

The CQI is used to measure channel quality, and is an effective parameter for resource scheduling and modulation and coding scheme (modulation and coding scheme, MCS) selection. The CQI is related to a received SINR, and is further related to receiving sensitivity of a modem (modem) of UE. In an implementation, the UE finds, by using an SINR, an MCS level closest to a target block error rate (block error rate, BLER); and the UE may determine, by searching a CQI mapping table, a CQI value corresponding to the MCS level. For example, the target BLER may be 10%.

Full-bandwidth CSI reporting: A receiving terminal reports comprehensive CSI of a full bandwidth occupied by a target link. For example, the comprehensive CSI is an average value of CSI of all subchannels (subbands) occupied by the target link.

Subchannel level (or subband level) CSI reporting: A receiving terminal reports CSI of each subchannel (subband) occupied by a target link.

Bitmap (Bitmap): A bit (bit) is used to mark a value (Value) corresponding to an element. For example, a preset resource pool includes eight subchannels. In embodiments of this application, UE may indicate, by using an 8-bit bitmap, a subchannel occupied by a target link. When the target link occupies an $i^{th}$ subchannel in the eight subchannels, a value of an $i^{th}$ bit in the 8-bit bitmap is set to 1; or when the target link does not occupy an $i^{th}$ subchannel in the eight subchannels, a value of an $i^{th}$ bit is set to 0.

Differential reporting: In a differential reporting manner, UE determines a maximum value (or a minimum value) in F to-be-reported values. The UE performs quantization encoding on the maximum value (or the minimum value), and performs quantization encoding on a difference between the F values and the maximum value (or the minimum value), to obtain quantization encoding information of differential reporting of the F values and quantization encoding information of the maximum value (or the minimum value). It may be understood that a value whose difference is 0 and that corresponds to the quantization encoding information is the maximum value (or the minimum value) in the F values.

It should be noted that when a difference between the maximum value and the minimum value in the F to-be-reported values is large, directly reporting the F values requires a large quantity of encoding bits. However, differential reporting can reduce reporting overheads. In addition to the foregoing differential reporting manner, in embodiments of this application, an SINR, a CQI, an ISR, or an RP may be reported in another differential reporting manner, and a quantization encoding step for differential reporting is not specifically limited.

The following describes a communication system in an embodiment of this application.

FIG. 1A is a schematic diagram of a communication system according to an embodiment of this application. A communication system 100 may include a terminal device 101, a terminal device 102, a terminal device 103, and a terminal device 104.

Data may be transmitted between the terminal device 101 and the terminal device 102 by using an SL1, and data may be transmitted between the terminal device 103 and the terminal device 104 by using an SL2. In other words, user data is directly transmitted between terminal devices, to avoid relay transmission of the user data by using a network device in cellular communication. When the SL1 and the SL2 perform communication by using a same communication resource, SL interference exists between the SL1 and the SL2, and the SL interference reduces communication quality of an SL. In this embodiment of this application, the SL may be a D2D link, for example, a communication link from a mobile phone to a mobile phone or a communication link from a mobile phone to a wearable device. In a vehicle-to-everything, an SL may alternatively be a vehicle-to-vehicle (vehicle-to-vehicle, V2V) communication link, a vehicle-to-pedestrian (Vehicle-to-Pedestrian, V2P) communication link, a vehicle-to-infrastructure (vehicle-to-infrastructure, V2I) link, or a vehicle-to-X device (vehicle-to-X, V2X) communication link.

In this embodiment of this application, the communication system 100 may further include at least one network device 105 (only one network device is shown). The network device 105 may provide communication coverage for cell coverage corresponding to the network device 105. In other words, the network device 105 may perform wireless communication with a terminal device in the cell coverage by using one or more antennas. For example, the terminal device 101 is in cell coverage corresponding to the network device 105. The terminal device 101 may receive, on a downlink (Downlink, DL), data sent by the network device 105, or may send data to the network device 105 on an uplink (Uplink, UL).

In some embodiments, the terminal device 101, the terminal device 102, the terminal device 103, and the terminal device 104 are in cell coverage of a same network device (for example, the network device 105). Alternatively, at least two of the terminal device 101, the terminal device 102, the terminal device 103, and the terminal device 104 are in cell coverage of different network devices. Alternatively, none of the terminal device 101, the terminal device 102, the terminal device 103, and the terminal device 104 is in cell coverage of a network device (namely, not in coverage of a cellular network). This is not specifically limited herein.

There are two resource allocation patterns in SL communication. One is a network control pattern, that is, an SL communication resource is scheduled by a network device (for example, a base station). The other is a distributed pattern, that is, a terminal device spontaneously selects an SL communication resource from a preconfigured SL resource pool. For an in-coverage (In-coverage) terminal device of a cellular network, the network control pattern and/or the distributed pattern may be used. For an out-of-coverage (Out-of-coverage) terminal device of a cellular network, only the distributed pattern can be used. It may be understood that when the terminal device 102 and the terminal device 104 perform SL communication by using a same communication resource, the terminal device 102 causes SL interference to the terminal device 104.

It should be noted that an SL includes a physical sidelink control channel (physical sidelink control channel, PSCCH) and a physical sidelink shared channel (physical sidelink shared channel, PSSCH). The PSSCH is used to carry user data for SL communication. The PSCCH is used to carry SL control information. The physical channel indicates a PSSCH channel resource and a transmission parameter. The SL control information may include SCI.

Figure 1B:
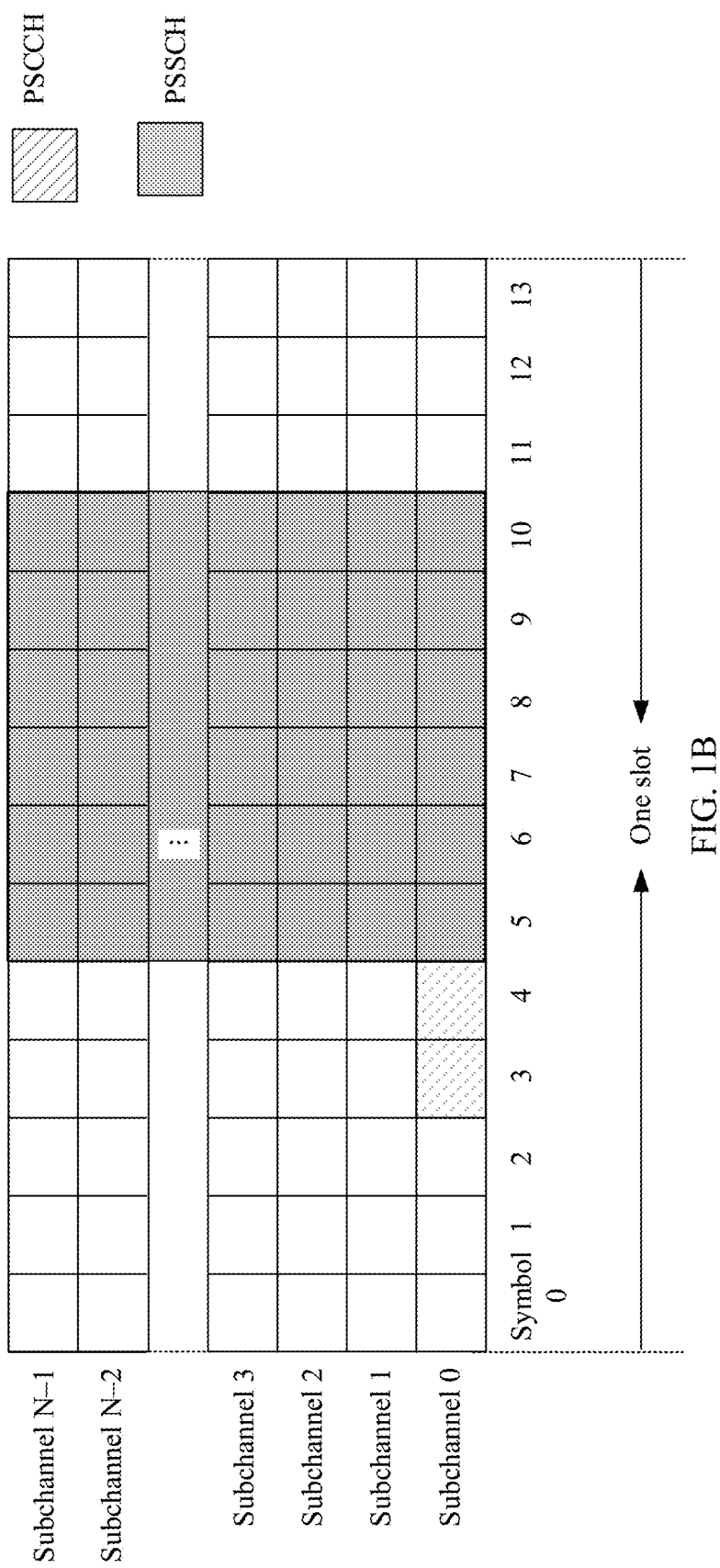
FIG. 1B and FIG. 1C each are a schematic diagram of a structure of an SL according to an embodiment of this application.
Figure 1C:
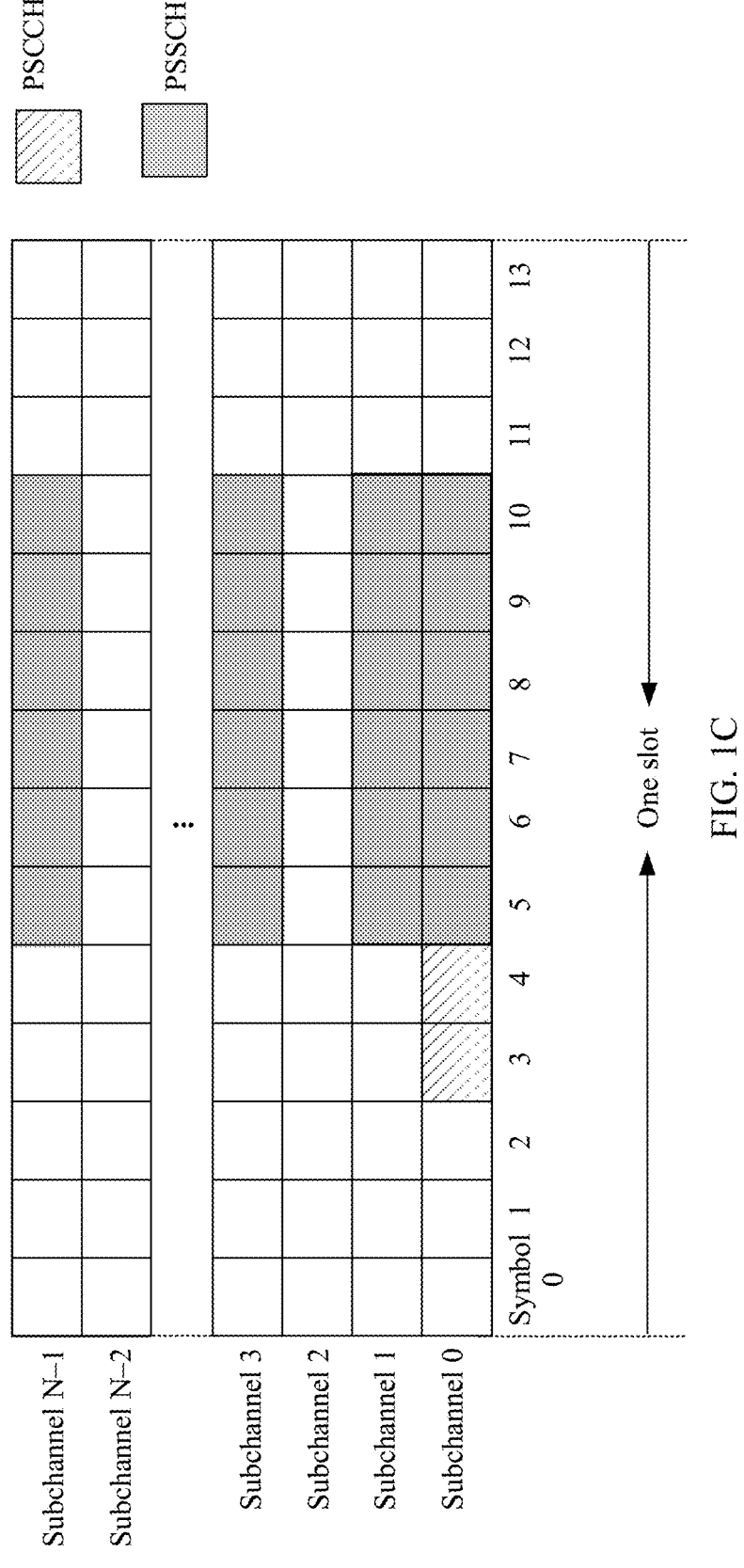

For example, FIG. 1B is a schematic diagram of a structure of an SL according to an embodiment of this application. As shown in FIG. 1B, the SL occupies N subchannels (that is, a subchannel 0 to a subchannel N–1) in frequency domain, and occupies 14 OFDM symbols (that is, a symbol 0 to a symbol 13) in one slot (shot) in time domain. A PSCCH of the SL occupies the subchannel 0, and subchannels occupied by a PSSCH of the SL are the foregoing N subchannels. In the slot shown in FIG. 1B, a PSCCH channel resource includes time-frequency resources corresponding to the subchannel 0 in a symbol 3 and a symbol 4, and a PSSCH channel resource includes time-frequency resources corresponding to the subchannel 0 to the subchannel N–1 in a symbol 5 to a symbol 10. It may be understood that an SL target link of TX UE occupies the N subchannels, and the TX UE may carry user data for SL communication on the N subchannels, and carry SL control information on the subchannel 0 shown in the figure. It should be noted that one slot may alternatively not include a PSCCH channel resource, and time-frequency resources corresponding to a subchannel 1 to the subchannel N–1 on the symbol 3 to the symbol 4 may alternatively be PSSCH channel resources. This is not specifically limited herein. In this embodiment of this application, the subchannels occupied by the SL may be inconsecutive. For example, as shown in FIG. 1C, the SL occupies some of the N subchannels in frequency domain, and any two occupied subchannels may be consecutive or inconsecutive in frequency domain. As shown in FIG. 1B and FIG. 1C, in this embodiment of this application, the subchannels occupied by the SL are subchannels occupied by the PSSCH of the SL.

In addition, there are three communication manners for SL communication: an SL unicast manner, an SL multicast manner, and an SL broadcast manner. In the SL unicast manner, one terminal device transmits information to another terminal device. In the SL multicast manner, one terminal device transmits information to a plurality of terminal devices. In the SL broadcast manner, one terminal device transmits information to all terminal devices that are in coverage of the terminal device.

In the communication system 100 provided in this embodiment of this application, a terminal device may determine a transmit power of the terminal device on each subchannel based on CSI fed back by another terminal device. The CSI may include an SINR, a channel quality indicator CQI, an ISR, or an RP.

The network device in this embodiment of this application may include network devices in various forms, for example, a macro base station, a micro base station (also referred to as a small cell), a relay station, and an access point. A base station may be a base transceiver station (Base Transceiver Station, BTS) in a time division synchronous code division multiple access (Time Division Synchronous Code Division Multiple Access, TD-SCDMA) system, or may be an evolved NodeB (Evolutional NodeB, eNB) in a long term evolution (Long Term Evolution, LTE) system, or a gNB in a 5G system and a new radio (New Radio, NR) system. In addition, the base station may alternatively be a transmission receive point (Transmission Receive Point, TRP), a central unit (Central Unit, CU), or another network entity.

A terminal device in this embodiment of this application may be a mobile phone (mobile phone), a tablet computer (Pad), a portable computer, a computer with a wireless transceiver function, a virtual reality (virtual reality, VR) terminal device, an augmented reality (augmented reality, AR) terminal device, a wireless terminal in industrial control (industrial control), a wireless terminal in a smart grid (smart grid), a wireless terminal in transportation safety (transportation safety), a wireless terminal in a smart city (smart city), a wireless terminal in a smart home (smart home), or the like. An application scenario is not limited in this embodiment of this application. Sometimes, the terminal device may also be referred to as user equipment (user equipment, UE), a terminal (terminal), an access terminal, a UE unit, a UE station, a mobile device, a mobile station, a mobile station (mobile station), a mobile terminal, a mobile client, a mobile unit (mobile unit), a remote station, a remote terminal device, a remote unit, a wireless unit, a wireless communication device, a user agent, a user apparatus, or the like.

It should be understood that FIG. 1A is merely an example for description of the communication system, and should not constitute any limitation on this application. The communication system 100 may further include more or fewer terminal devices and network devices. This is not limited herein. In this embodiment of this application, a network device and a terminal device may alternatively be referred to as communication devices.

For ease of description, in this specification, a terminal device may be referred to as UE for short, a transmit-end terminal device may be referred to as a transmitting terminal or TX UE for short, and a receive-end terminal device may be referred to as a receiving terminal or RX UE for short.

Figure 2:
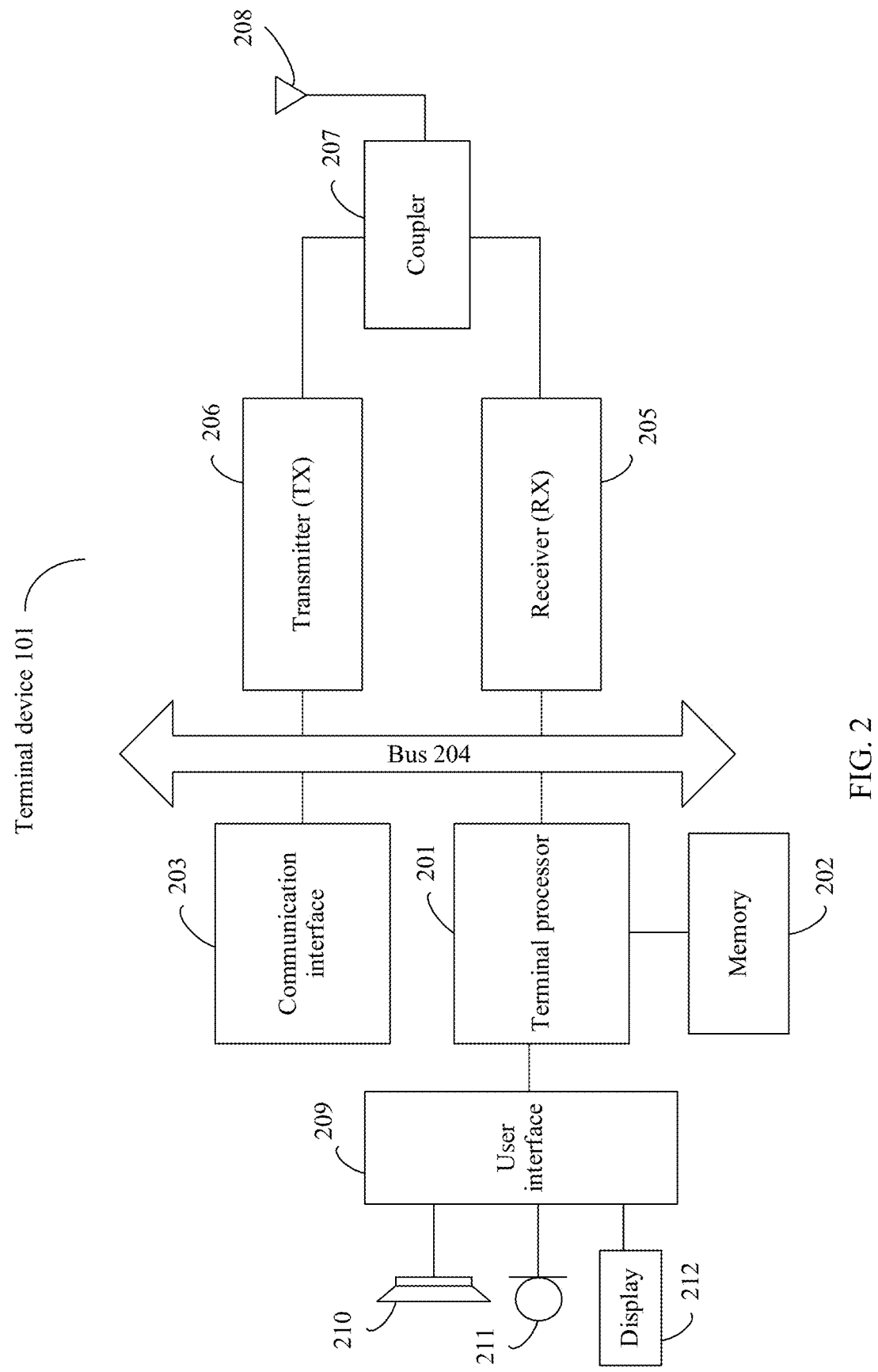
FIG. 2 is a schematic diagram of a structure of an electronic device according to an embodiment of this application.

The following describes the terminal device in this embodiment of this application by using the terminal device 101 as an example. As shown in FIG. 2, the terminal device 101 may include: one or more terminal device processors 201, memories 202, communication interfaces 203, receivers 205, transmitters 206, couplers 207, antennas 208, user interface 209, and input/output modules (including an audio input/output module 210, a button input module 211, a display 212, and the like). These components may be connected by using a bus 204 or in another manner. In FIG. 2, an example in which the components are connected by using the bus is used.

The communication interface 203 may be configured to perform communication between the terminal device 101 and another communication device, for example, a network device. Specifically, the network device may be the network device 105 shown in FIG. 1A. Specifically, the communication interface 203 may be a communication interface in long term evolution (LTE) (4G), or a communication interface in 5G or future new radio. In addition to a wireless communication interface, the terminal device 101 may further be configured with a wired communication interface 203, for example, a local access network (Local Access Network, LAN) interface.

The transmitter 206 may be configured to perform transmission processing on a signal output by the terminal device processor 201, for example, implement directional sending through beamforming. The receiver 205 may be configured to receive a mobile communication signal received by the antenna 208, for example, implement directional receiving through beamforming. In some embodiments of this application, the transmitter 206/receiver 205 may include a beamforming controller, configured to control directional sending/receiving of a signal by multiplying a transmitted signal/a received signal by weight vectors W1, . . . , and Wm. The beamforming controller in the transmitter 206/receiver 205 changes a value obtained by multiplying the transmitted signal/received signal and a weight vector, so that base station beam switching mentioned in this embodiment of this application can be implemented.

In some embodiments of this application, the transmitter 206 and the receiver 205 may be considered as a wireless modem. The terminal device 101 may include one or more transmitters 206 and one or more receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide mobile communication signals received by the antenna 208 into a plurality of channels of signals, and allocate the plurality of channels of signals to a plurality of receivers 205.

In addition to the transmitter 206 and the receiver 205 shown in FIG. 2, the terminal device 101 may further include another communication component, for example, a GPS module, a Bluetooth (Bluetooth) module, or a wireless fidelity (wireless fidelity, Wi-Fi) module. In addition to supporting the foregoing wireless communication signal, the terminal device 101 may further support another wireless communication signal, for example, a satellite signal or a short-wave signal. In addition to supporting wireless communication, the terminal device 101 may further be configured with a wired network interface (for example, a LAN interface) to support wired communication.

The input/output module may be configured to implement interaction between the terminal device 101 and a terminal device/an external environment, and may mainly include the audio input/output module 210, the button input module 211, the display 212, and the like. Specifically, the input/output module may further include a camera, a touchscreen, a sensor, and the like. The input/output module communicates with the terminal device processor 201 through the user interface 209.

The memory 202 is coupled to the terminal device processor 201, and is configured to store various software programs and/or a plurality of groups of instructions. Specifically, the memory 202 may include a high-speed random access memory, or a non-volatile memory, for example, one or more disk storage devices, a flash memory device, or another non-volatile solid-state storage device. The memory 202 may store an operating system (hereinafter referred to as a system for short), for example, an embedded operating system such as ANDROID, IOS, WINDOWS, or LINUX. The memory 202 may further store a network communication program, and the network communication program may be configured to communicate with one or more attachment devices, one or more terminal devices, and one or more network devices. The memory 202 may further store a terminal device interface program. The terminal device interface program may vividly display content of an application program via a graphical operation interface, and receive, via an input control such as a menu, a dialog box, or a key, a control operation performed by the terminal device on the application program.

In some embodiments of this application, the memory 202 may be configured to store an implementation program, on a side of the terminal device 101, of a signal transmission method provided in one or more embodiments of this application. For implementation of the signal transmission method provided in one or more embodiments of this application, refer to subsequent embodiments.

The terminal device processor 201 may be configured to read a computer-readable instruction and execute the computer-readable instruction. Specifically, the terminal device processor 201 may be configured to: invoke a program stored in the memory 202, for example, the implementation program, on the side of the terminal device 101, of the signal transmission method provided in one or more embodiments of this application; and execute instructions included in the program.

It may be understood that the terminal device 101 may be the terminal device in the wireless communication system 100 shown in FIG. 1A.

It should be noted that the terminal device 101 shown in FIG. 2 is merely an implementation of this embodiment of this application. In actual application, the terminal device 101 may further include more or fewer components. This is not limited herein.

The following describes an SL data transmission method provided in this embodiment of this application in detail with reference to the accompanying drawings.

In the distributed resource allocation pattern, when TX UE of an SL sends data to RX UE, the TX UE selects, from a preconfigured resource pool through resource awareness, a time-frequency resource used for transmission. In this embodiment of this application, two interference measurement-based SL data transmission solutions (hereinafter referred to as Solution 1 and Solution 2 for short) are provided. The proposed solutions can effectively prevent different transmitting terminals from selecting a same time-frequency resource, to reduce SL interference of a receiving terminal. The following further describes the proposed Solution 1 and Solution 2.

Solution 1

In Solution 1 provided in this embodiment of this application, before sending SL data, the TX UE selects, from a preconfigured resource pool through resource awareness and resource selection, a time-frequency resource used for data transmission, to reduce interference between different SLs.

It should be noted that, to facilitate resource awareness, in this embodiment of this application, SL control information (Sidelink Control Information, SCI) includes two parts: SCI 1 and SCI 2. The SCI 1 is transmitted through a PSCCH, and mainly carries information related to PSSCH resource scheduling and information about decoding the SCI 2. The SCI 2 is transmitted through a PSSCH, and mainly carries information related to decoding data on the PSSCH.

Figure 3:
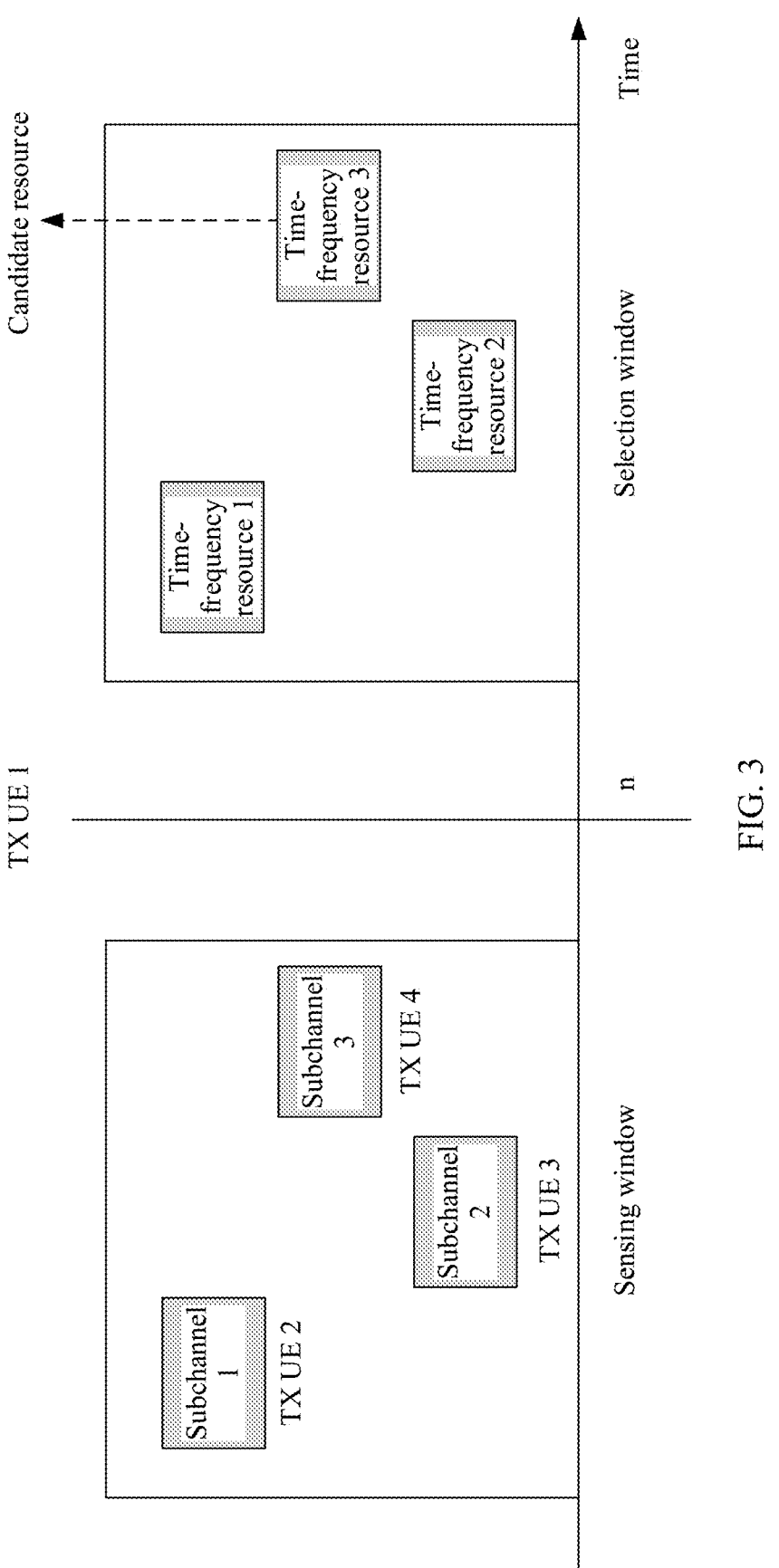
FIG. 3 is a schematic diagram of an interference measurement-based SL data transmission solution according to an embodiment of this application.

Specifically, as shown in FIG. 3, in Solution 1, a trigger moment n is first set for TX UE i, a sensing window is set before the moment n, and a selection window is set after the moment n. In the sensing window, the TX UE i detects SCI 1 of other TX UEs on all subchannels. When the TX UE i successfully decodes SCI 1 of another TX UE, the TX UE i may obtain reserved resource indication information of the another TX UE and a location of a demodulation reference signal (Demodulation Reference Signal, DMRS) on a PSSCH or a PSCCH, so that a reference signals received power (Reference Signals Received Power, RSRP) can be measured based on the PSCCH DMRS or the PSSCH DMRS of the another TX UE. The reserved resource indication information may be used to indicate a time-frequency resource and/or a transmission periodicity for another TX UE to perform SL communication, and the TX UE i may determine, based on the reserved resource indication information, a subchannel occupied by another TX UE in the selection window. When a subchannel in the selection window is not occupied by another TX UE, or is occupied by another TX UE but the RSRP obtained through measurement is less than a preset sensing threshold, the subchannel is used as a candidate resource of the TX UE i in the selection window. When a ratio of candidate resources to total resources in the selection window is less than 20%, the sensing threshold is increased by 3 dB, and candidate resource selection is performed again. After the candidate resources are determined, the TX UE 1 randomly selects a candidate resource from the selection window for SL data transmission.

For example, as shown in FIG. 3, the TX UE 1 detects, on a subchannel 1 in the sensing window before the moment n, SCI 1 sent by TX UE 2, obtains an RSRP of the TX UE 2 through measurement based on the SCI 1, and determines a time-frequency resource 1 occupied by the TX UE 2 in the selection window. The TX UE 1 detects, on a subchannel 2 in the sensing window, SCI 1 sent by TX UE 3, obtains an RSRP of the TX UE 3 through measurement based on the SCI 1, and determines a time-frequency resource 2 occupied by the TX UE 3 in the selection window. The TX UE 1 detects, on a subchannel 3 in the sensing window, SCI 1 sent by TX UE 4, obtains an RSRP of the TX UE 4 through measurement based on the SCI 1, and determines a time-frequency resource 3 occupied by the TX UE 4 in the selection window. The RSRPs of the TX UE 2 and the TX UE 3 are greater than the preset sensing threshold, and the RSRP of the TX UE 4 is less than the preset sensing threshold. Therefore, the TX UE 1 uses the time-frequency resource 3 and time-frequency resources that are in the selection window and that are not occupied by another TX UE as candidate resources of the TX UE 1. The TX UE1 randomly selects a time-frequency resource from the candidate resources to perform data transmission.

It may be understood that, in Solution 1, the TX UE 1 may perform resource selection based on whether interference obtained in a resource sensing process through measurement exceeds the preset sensing threshold. When interference from another TX UE on a subchannel is less than the preset sensing threshold, the TX UE 1 and the another TX UE may multiplex the subchannel; or when interference from another TX UE on a subchannel is greater than or equal to the preset sensing threshold, the TX UE 1 and the another TX UE cannot multiplex the subchannel.

Solution 2

In Solution 2 provided in this embodiment of this application, when sending SL data, the TX UE uses a carrier sense multiple access (Carrier Sense Multiple Access, CSMA) mechanism, and determines a sending moment of the SL data by detecting a channel occupation status, to avoid interference between different UEs as much as possible.

Specifically, before sending data, the TX UE i first determines the channel occupation status through carrier sensing, that is, the TX UE i detects an energy magnitude of a signal on a channel. When the energy magnitude of the signal is greater than a preset energy threshold, it is determined that the channel is occupied; or when the energy magnitude of the signal is less than or equal to a preset energy threshold, it is determined that the channel is not occupied. When determining that the channel is not occupied, the TX UE i randomly selects back-off time Ti, and starts a countdown from Ti. Before the countdown ends, when the TX UE i determines, through carrier sensing, that the channel is occupied, the TX UE freezes the countdown. After the countdown is frozen, when the TX UE i determines, through carrier sensing, that the channel is not occupied, the TX UE i continues the countdown from a frozen count value. When the countdown ends (that is, the countdown decreases to 0), the TX UE i occupies a full bandwidth and starts to send the SL data.

Figures 4, 5:
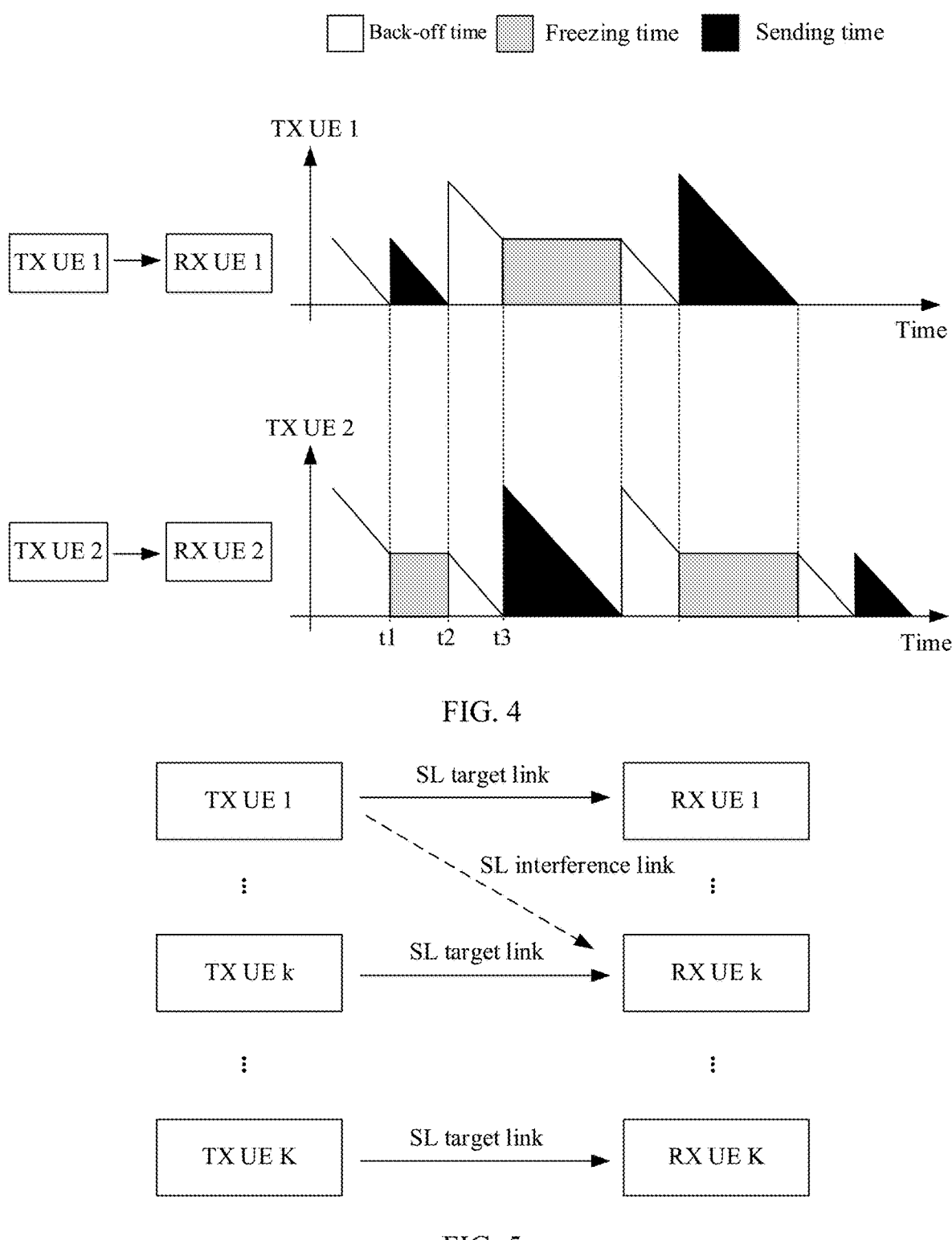
FIG. 4 is a schematic diagram of another interference measurement-based SL data transmission solution according to an embodiment of this application.
FIG. 5 is a schematic diagram of K SL transmission pairs according to an embodiment of this application.

For example, the TX UE 1 and the TX UE 2 shown in FIG. 4 are close to each other. When the TX UE 1 (or the TX UE 2) sends SL data, the TX UE 2 (or the TX UE 1) determines, through carrier sensing, that a channel is occupied. As shown in FIG. 4, at a moment t1, when a countdown of back-off time T1 of the TX UE 1 ends, the TX UE 1 starts to occupy a full bandwidth to send data to the RX UE 1 at the moment t1, and ends data sending at a moment t2. Within the moment t1 to the moment t2, the TX UE 2 determines, through carrier sensing, that the channel is occupied, and the TX UE 2 freezes a countdown of T2. At the moment t2, the TX UE 2 determines, through carrier sensing, that the channel is not occupied, and the TX UE 2 starts the frozen countdown of the T2. At a moment t3, the countdown of the back-off time T2 of the TX UE 2 ends, and the TX UE 2 starts to occupy a full bandwidth to send data to the RX UE 2 at the moment t3.

It may be understood that, in Solution 2, the TX UE 1 may determine, based on interference obtained from another TX UE through measurement and further based on whether the interference exceeds the preset energy threshold, whether the TX UE 1 and the another TX UE can simultaneously occupy the full bandwidth to send data. When the interference from the another TX UE is less than the preset energy threshold, the TX UE 1 and the another TX UE can simultaneously occupy the full bandwidth to send data. Alternatively, when the interference from the another TX UE is greater than or equal to the preset energy threshold, the TX UE 1 and the another TX UE cannot simultaneously occupy the full bandwidth to send data.

However, whether data sent by a target transmit end can be successfully decoded depends on a signal to interference plus noise ratio (Signal to Interference plus Noise Ratio, SINR) of a target link, instead of only depending on interference intensity between TX UEs. Therefore, a resource reuse criterion based on TX UE interference measurement is neither sufficient nor necessary for achieving optimal performance.

To achieve optimal performance, an embodiment of this application further provides an SL data transmission method. In the proposed method, an SL distributed resource reuse pattern is redesigned, to maximize a system capacity. Distributed power control is implemented through CSI measurement and reporting, so that resource reuse of a data channel between a plurality of SL transmission pairs is implemented, and resource utilization of a distributed resource allocation pattern is improved. In addition, spectrum efficiency is effectively improved, and system performance similar to centralized control is obtained.

The following specifically describes the foregoing SL data transmission method by using K SL transmission pairs shown in FIG. 5 as an example.

As shown in FIG. 5, the communication system 100 may include K SL transmission pairs, and a $k^{th}$ SL transmission pair in the K SL transmission pairs includes TX UE k and RX UE k, where the RX UE k is an SL target receive end of the TX UE k, and the TX UE k is an SL target transmit end of the RX UE k. K is a positive integer greater than 1, and k is a positive integer greater than 0 and less than or equal to K.

The TX UE may transmit SL data on N subchannels in an SL preset resource pool. It may be understood that when an SL target link of the TX UE k and an SL target link of TX UE j multiplex a same subchannel, an SL interference link is formed between the TX UE k and RX UE j, where j≠k. A system capacity of the $k^{th}$ transmission pair in the K SL transmission pairs in an $n^{th}$ subchannel in the N subchannels may be expressed as $C_k[n]$.

First, in this embodiment of this application, to maximize a system capacity of the K SL transmission pairs, a resource allocation problem between the K SL transmission pairs may be modeled as the following non-convex optimization problem:

$$\max_{\{p_k[n]\}} \sum_{k=1}^{K} \sum_{n=1}^{N} C_k[n],$$

$$\text{s.t.} \sum_{n=1}^{N} p_k[n] \le P_{max}, \forall k$$

In the problem, $p_k[n]$ is a transmit power of a $k^{th}$ TX UE on the $n^{th}$ subchannel, where $p_k[n] \ge 0$, and $P_{max}$ is a maximum transmit power of each TX UE; $C_k[n]=\log_2(1+SINR_k[n])$, where $SINR_k[n]$ is an SINR of the RX UE k on the $n^{th}$ subchannel;

$$SINR_k[n] = \frac{|h_{kk}[n]|^2 * p_k[n]}{\sum_{j \ne k} |h_{jk}[n]|^2 * p_j[n] + \sigma^2},$$

where $h_{kk}[n]$ is a channel gain of an SL target link between the TX UE k and the RX UE k on the $n^{th}$ subchannel, $h_{jk}[n]$ is a channel gain of an SL interference link between the TX UE j and the RX UE k on the $n^{th}$ subchannel, $\sigma^2$ is a noise power, and k is a positive integer greater than 0 and less than or equal to K.

A transmit power of each TX UE on each subchannel may be obtained by solving the foregoing optimization problem. When $p_k[n]>T$, the TX UE k may occupy the $n^{th}$ subchannel to send data. When $p_k[n] \le T$, the TX UE k does not occupy the $n^{th}$ subchannel. In this way, resource reuse of a plurality of SL transmission pairs can be implemented. T is a preset threshold. In an implementation, a value of T is 0.

However, the foregoing optimization problem is a non-convex optimization problem, and it is difficult to obtain a global optimal solution. To simplify solving of the foregoing optimization problem, an approximate optimization method may be used. Common approximate optimization methods include an iterative water-filling (Iterative Water-Filling, IWF) algorithm, a gradient descent (Gradient Descent, GD) algorithm, a weighted minimum mean square error (Weighted Minimum Mean Square Error, WMMSE) algorithm, and the like.

The WMMSE algorithm is a classic interference management algorithm, and at least one local optimal solution of the foregoing problem may be obtained through iterative optimization. An essential idea of the WMMSE algorithm is to use an equation relationship between a minimum mean square error (Minimum Mean Square Error, MMSE) and an SINR, that is $MMSE_k[n]=1/(1+SINR_k[n])$, to convert the foregoing optimization problem into the following equivalent optimization problem:

$$\min_{\{p_k[n],u_k[n],c_k[n]\}} \sum_{k=1}^{K} \sum_{n=1}^{N} (c_k[n]e_k[n] - \log_2(c_k[n])),$$

-continued $$\text{s.t.} \sum_{n=1}^{N} p_k[n] \le P_{max}, \forall k, \text{ where}$$

$$e_k[n] =$$

$$(u_k[n]|h_{kk}[n]| * \sqrt{p_k[n]} - 1)^2 + \sum_{j \ne k} (u_k[n])^2 |h_{jk}[n]|^2 * p_j[n] + (u_k[n])^2 \sigma^2.$$

In the foregoing equivalent optimization problem, iterative optimization may be performed on the three groups of variables $\{p_k[n]\}$, $\{u_k[n]\}$, and $\{c_k[n]\}$ in an alternate optimization manner. Specifically, in a $t+1^{th}$ iteration, power update of the $k^{th}$ TX UE on the $n^{th}$ subchannel may be expressed as follows:

$$u_k^{(t+1)}[n] =$$

$$\frac{|h_{kk}[n]| * \sqrt{p_k^{(t)}[n]}}{\sum_{j=1}^{K} |h_{jk}[n]|^2 * p_j^{(t)}[n] + \sigma^2} = \frac{SINR_k^{(t)}[n]}{|h_{kk}[n]| * \sqrt{p_k^{(t)}[n]} * (1 + SINR_k^{(t)}[n])},$$

$$c_k^{(t)}[n] = \frac{1}{1 - u_k^{(t+1)}[n] * |h_{kk}[n]| * \sqrt{p_k^{(t)}[n]}} = 1 + SINR_k^{(t)}[n], \text{ and}$$

$$\sqrt{p_k^{(t+1)}[n]} = \frac{u_k^{(t+1)}[n] * c_k^{(t+1)}[n] * |h_{kk}[n]|}{\sum_{j=1}^{K} (u_j^{(t+1)}[n])^2 * c_j^{(t+1)}[n] * |h_{kj}[n]|^2 + \lambda_k^{(t+1)}}, \text{ where}$$

$$\lambda_k^{(t+1)} \ge 0$$

is a parameter that makes $\sum_{n=1}^{N} p_k^{(t+1)}[n] \le P_{max}$ true. Optionally, $\lambda_k^{(t+1)}$ may be solved by using a dichotomy.

In some embodiments of this application, the foregoing iterative update process may be simplified into the following representation form 1:

$$\sqrt{p_k^{(t+1)}[n]} = \frac{SINR_k^{(t)}[n]/\sqrt{p_k^{(t)}[n]}}{\frac{1}{p_k^{(t)}[n]} \sum_{j=1}^{K} ISR_{kj}^{(t)}[n] * \frac{(SINR_j^{(t)}[n])^2}{1 + SINR_j^{(t)}[n]} + \lambda_k^{(t+1)}}$$

$ISR_{kj}[n]$ represents a ratio of interference received power $RP_{kj}[n]$ that is received by the RX UE j from the TX UE k on the $n^{th}$ subchannel to a signal received power $RP_{jj}[n]$ that is received by the RX UE j from the target transmit end TX UE j, that is, $$ISR_{kj}[n] = \frac{RP_{kj}[n]}{RP_{jj}[n]}.$$

Based on the representation form 1, information required by the TX UE k to update the transmit power of the $n^{th}$ subchannel includes: (1) SINRs of all RX UEs that occupy SL transmission pairs on the $n^{th}$ subchannel, that is, SINR; [n], where j is a positive integer greater than 0 and less than or equal to K; and (2) an ISR of the TX UE k to RX UE that occupies another SL transmission pair on the $n^{th}$ subchannel, that is, $ISR_{kj}[n]$, where j is a positive integer greater than 0 and less than or equal to K, and j≠k. It may be understood that an interference-to-signal ratio of the TX UE k to the RX UE k is $ISR_{kk}^{(t)}[n]=1$.

In some embodiments of this application, the foregoing iterative update process may be simplified into the following representation form 2:

$$\sqrt{p_k^{(t+1)}[n]} = \frac{SINR_k^{(t)}[n]/\sqrt{RP_{kk}^{(t)}[n]}}{\sum_{j=1}^{K} \frac{|h_{kj}[n]|^2}{RP_{jj}^{(t)}[n]} * \frac{(SINR_j^{(t)}[n])^2}{1 + SINR_j^{(t)}[n]} + \lambda_k^{(t+1)}}, \text{ where}$$

$$RP_{kj}[n] = |h_{kj}[n]|^2 p_k[n], \text{ and } |h_{kj}[n]|^2 = \frac{RP_{kj}[n]}{p_k[n]}.$$

Based on the representation form 2, information required by the TX UE k to update the transmit power of the $n^{th}$ subchannel includes: (1) SINRs of all RX UEs that occupy SL transmission pairs on the $n^{th}$ subchannel, that is, $SINR_j[n]$, where j is a positive integer greater than 0 and less than or equal to K; (2) signal RPs received, on the target link, by all RX UEs that occupy SL transmission pairs on the $n^{th}$ subchannel, that is, $RP_{jj}[n]$, where j is a positive integer greater than 0 and less than or equal to K; and (3) an interference RP of the TX UE k to another RX UE that occupies an SL transmission pair on the $n^{th}$ subchannel, that is, $RP_{kj}[n]$, where j is a positive integer greater than 0 and less than or equal to K, and j≠k.

It can be learned based on the foregoing model optimization that, in this embodiment of this application, the TX UE may update the transmit power of the TX UE on each subchannel in a distributed pattern, to effectively improve a system capacity and a resource reuse rate.

To perform power update in a distributed pattern, in a possible implementation, the TX UE obtains, through CSI reporting performed by the RX UE, information required for power update. However, in existing SL communication, only full-bandwidth CSI reporting is supported, and reporting content includes only a CQI and an RI. This cannot meet information required for the power update of the TX UE in the foregoing representation form 1 and representation form 2. In the solution provided in this embodiment of this application, existing CSI measurement and reporting content may be extended, so that the TX UE performs distributed power control based on CSI reporting content of the RX UE, to obtain performance similar to centralized control. Specifically, the following uses the K SL transmission pairs shown in FIG. 5 as an example to describe in detail with reference to a schematic flowchart of an SL data transmission method shown in FIG. 6.

As shown in FIG. 6, the SL data transmission method includes but is not limited to step S101 to step S105.

S101: TX UE k sends a first CSI-RS to RX UE k on N subchannels of an SL preset resource pool, where k is a positive integer less than or equal to K.

In some embodiments of this application, the TX UE k sends the first CSI-RS to the RX UE k on PSSCHs of the N subchannels according to a predefined rule. The foregoing predefined rule indicates a time-frequency resource location of the first CSI-RS.

In an implementation, time-frequency resource locations of CSI-RSs sent by different TX UEs may be different, and when sending the first CSI-RS on the N subchannels, the TX UE k carries an identity (Identity, ID) of the TX UE k. The RX UE may determine the predefined rule of the TX UE based on the ID of the TX UE k, and further determine the time-frequency resource location of the first CSI-RS sent by the TX UE.

In some embodiments of this application, the TX UE k sends the first CSI-RS and first indication information of the first CSI-RS on the N subchannels, where the first indication information is used to indicate the time-frequency resource location of the first CSI-RS.

In an implementation, the first indication information is an RRC higher layer signaling parameter, and the RRC higher layer signaling parameter is carried on the PSSCHs of the N subchannels. In an implementation, the first indication information is a preset field in first SCI, and the first SCI may be SCI1 carried on a PSCCH, or may be SCI2 carried on a PSSCH.

In some embodiments of this application, the first indication information is an RRC higher layer signaling parameter. Before sending the first CSI-RS to the RX UE k on the N subchannels, the TX UE k first sends the first indication information of the first CSI-RS, so that RX UE of each SL transmission pair subsequently detects, based on the first indication information of the first CSI-RS, the first CSI-RS sent by the TX UE k. In an implementation, the TX UE k sends the first indication information to the RX UE k on the N subchannels in a unicast manner. In another implementation, the TX UE k sends the first indication information on the N subchannels in a broadcast manner.

It should be noted that, in an implementation, generation of a CSI-RS sequence is represented as a random sequence generated at a specific slot and symbol location by a scrambling ID indicated by a radio resource control layer (Radio Resource Control, RRC). The TX UE modulates the CSI-RS sequence into a QPSK signal, multiplies the QPSK signal by a power factor, a time-domain orthogonal code, and a frequency-domain orthogonal code, and then maps the QPSK signal to a specific port time-frequency resource location, to generate a CSI-RS carried on a PSSCH.

In an implementation, the predefined rule or the first indication information is used to indicate a CSI-RS pattern (pattern), and the CSI-RS pattern is used to indicate a time-frequency resource location of the first CSI-RS sent by the TX UE in one slot.

For example, one RB includes 12 subcarriers, and one slot includes 14 OFDM symbols. For an antenna port 1, in a possible CSI-RS pattern, a CSI-RS is sent on a $j^{th}$ subcarrier of an $i^{th}$ OFDM symbol, where 3≤i≤12 and 0≤j≤11. For an antenna port 2, in a possible CSI-RS pattern, a CSI-RS is sent on a j~j+1$^{th}$ subcarrier of an $i^{th}$ OFDM symbol, where 3≤i≤12 and j∈{0,2,4,6,8,10}.

In some embodiments of this application, all possible CSI-RS patterns are numbered based on time-frequency resource locations of CSI-RSs. For example, for the antenna port 1, for different values of j and i, there are 120 types of possible CSI-RS patterns, and the 120 types of possible CSI-RS patterns are respectively numbered 0 to 119. Each number of the CSI-RS patterns corresponds to one value of j and one value of 1. The RX UE may determine the values of j and i based on the foregoing predefined rule or a CSI-RS pattern indicated by the first indication information, that is, a time-frequency resource location of a CSI-RS sent by the TX UE.

In some embodiments of this application, the TX UE k periodically sends a CSI-RS to the RX UE k; and the foregoing predefined rule and the first indication information are further used to indicate a transmission periodicity of a CSI-RS.

In some embodiments of this application, the TX UE k aperiodically sends a CSI-RS to the RX UE k, and the TX UE k may indicate, by using a preset field of the first SCI, that the CSI-RS is sent in a current slot, so that an interested RX UE can receive the CSI-RS. For example, a CSI-RS trigger is configured in the first SCI. When a value of the CSI-RS trigger is 1, it indicates that the TX UE k sends a CSI-RS in a current slot; or when a value of the CSI-RS trigger is not 1, it indicates that the TX UE k does not send a CSI-RS in a current slot.

In some embodiments of this application, the TX UE k further sends fourth indication information in step S101. The fourth indication information is used to indicate subchannels occupied by the TX UE k, and the subchannels occupied by the TX UE k may be inconsecutive subchannels in the SL preset resource pool. For example, the fourth indication information may be presented as an M-bit Bitmap.

In some embodiments of this application, before sending user data to the RX UE k for the first time, the TX UE k sends the first CSI-RS on all subchannels in the SL preset resource pool, and transmit powers on all the subchannels are equal. Then, the TX UE k may update a transmit power of each subchannel based on CSI reporting content of a plurality of RX UEs, determine an occupied subchannel, and send the user data on the occupied subchannel.

In some embodiments of this application, when sending user data to the RX UE k for the first time, the TX UE k sends the first CSI-RS and the user data on all subchannels in the SL preset resource pool, and transmit powers on all the subchannels are equal. Then, the TX UE k may update a transmit power of each subchannel based on CSI reporting content of a plurality of RX UEs, determine an occupied subchannel, and send user data on the occupied subchannel.

Optionally, a first-time transmit power of each subchannel of the TX UE k is equal to $P_{max}/N$.

It may be understood that, in some embodiments, the TX UE k sends only a CSI-RS for the first time. This can avoid increasing interference to another SL transmission pair. In some other embodiments, the TX UE k sends a CSI-RS for the first time and then sends user data, and sends new user data after a power is updated, so that data transmission efficiency can be improved, and power consumption can be reduced. However, interference to another SL transmission pair is increased.

In this embodiment of this application, the SL preset resource pool includes M subchannels in total. In some embodiments, before the TX UE k transmits the first CSI-RS, the TX UE k selects N subchannels from the M subchannels based on an interference measurement method, where M is a positive integer greater than or equal to N. Then, the TX UE k sends the first CSI-RS on the PSSCHs of the N subchannels. The foregoing interference measurement method may be the foregoing Solution 1, or may be another solution. This is not specifically limited herein. In some embodiments of this application, M is equal to N.

S102: RX UE j detects, on a subchannel occupied by an SL target link, a CSI-RS sent by at least one TX UE, where the at least one TX UE includes the TX UE k, and j is a positive integer less than or equal to K.

Specifically, in some embodiments of this application, the RX UE j blindly detects a control channel on all subchannels of the SL preset resource pool, to obtain control information sent by the target transmit end TX UE j and TX UE of another SL transmission pair on the control channel. The control information indicates a subchannel occupied by an SL transmission pair. The RX UE j determines, by decoding the control information sent by the target transmit end TX UE j, H subchannels (that is, subchannels occupied by a PSSCH corresponding to the SL target link) occupied by the SL target link, and determines, by decoding the control information sent by the TX UE of the another SL transmission pair, subchannels occupied by the another SL transmission pair. The RX UE j detects, on a PSSCH channel resource in the H subchannels occupied by the SL target link, a CSI-RS sent by at least one TX UE, where the at least one TX UE includes the TX UE k, and j is a positive integer less than or equal to K. H is a positive integer less than or equal to M. It may be understood that when M is equal to N, the N subchannels include the H subchannels, and TX UE (for example, the TX UE k) in the at least one TX UE and the TX UE j may multiplex one or more subchannels. When a quantity of TX UEs in the at least one TX UE is greater than or equal to 2, any two TX UEs in the at least one TX UE may multiplex zero, one, or more subchannels.

In some embodiments of this application, the RX UE j detects, on H1 subchannels of the H subchannels occupied by the SL target link, a CSI-RS sent by at least one TX UE. The CSI-RS sent by the at least one TX UE includes the first CSI-RS sent by the TX UE k, and H1 is a positive integer greater than or equal to 1.

In some embodiments of this application, in step S101, the TX UE k sends the first CSI-RS according to the predefined rule. The RX UEj may detect, on h subchannels of the H1 subchannels based on the time-frequency resource location that is of the first CSI-RS and that is indicated by the predefined rule of the TX UE k, the first CSI-RS sent by the TX UE k, where h is a positive integer greater than or equal to 1 and less than or equal to H1.

In some embodiments of this application, in step S101, the TX UE k sends the first CSI-RS and the first indication information. The RX UE j may detect, based on the time-frequency resource location that is of the first CSI-RS and that is indicated by the first indication information, the first CSI-RS sent by the TX UE k in the data received on the h subchannels in the H1 subchannels.

In an implementation, the first indication information may be an RRC higher layer signaling parameter, and the RRC higher layer signaling parameter is carried on a PSSCH channel resource. The RX UE j may obtain, through decoding based on the control information of the TX UE k obtained through blind detection, an RRC higher layer signaling parameter sent by the TX UE k on a PSSCH, and obtain the time-frequency resource location of the first CSI-RS sent by the TX UE k. Further, based on the time-frequency resource location, the RX UE j may detect, on the H subchannels occupied by the SL target link, the first CSI-RS sent by the TX UE k.

In an implementation, the first indication information may be a preset field in first SCI, and the first SCI may be SCI1 carried on a PSCCH. The control information that is of the TX UE k and that is obtained by the RX UE j through blind detection includes SCI 1, and the time-frequency resource location of the first CSI-RS sent by the TX UE k may be obtained based on a preset field in the SCI 1. Further, based on the time-frequency resource location, the RX UE j may detect, on the PSSCH channel resource in the H subchannels, the first CSI-RS sent by the TX UE k.

In an implementation, the first indication information may be a preset field in first SCI, and the first SCI may be SCI2 carried on a PSSCH. The control information that is of the TX UE k and that is obtained by the RX UE j through blind detection includes SCI 1, and the SCI 1 carries information related to PSSCH resource scheduling and information about decoding SCI 2. The RX UE obtains, through decoding based on the SCI 1, SCI 2 sent by the TX UE k on the PSSCH. The RX UE j may obtain the time-frequency resource location of the first CSI-RS sent by the TX UE k based on a preset field in the SCI 2. Further, based on the time-frequency resource location, the RX UE j may detect, on the PSSCH channel resource in the H subchannels, the first CSI-RS sent by the TX UE k.

S103: The RX UE j determines, based on the CSI-RS sent by the at least one TX UE, CSI of each subchannel occupied by the SL target link, and reports the CSI of each subchannel to the at least one TX UE.

Specifically, the RX UE j determines, based on the CSI-RS sent by the at least one TX UE, CSI of at least one subchannel in the subchannels occupied by the SL target link, and reports the CSI of the at least one subchannel to the at least one TX UE.

It can be learned from the foregoing power update representation form 1 and representation form 2 that, in this embodiment of this application, CSI reporting content in SL distributed power control may include two content forms, namely, the following content form 1 and content form 2.

In the content form 1, the CSI reporting content includes at least one of the following items. CSI reported by the RX UE j includes an SINR of a subchannel occupied by the RX UE j on the SL target link, and an ISR that is received on the subchannel and that is of an interference RP from each SL interference link to a signal RP from the SL target link.

In the content form 2, CSI reporting content includes at least one of the following items. CSI reported by the RX UE j includes an SINR of the RX UE j on a subchannel occupied by the SL target link, an interference RP that is received on the subchannel and that is from each SL interference link, and a signal RP that is received on the subchannel and that is from the SL target link.

In some embodiments of this application, the RX UE j may map a measured SINR to a CQI, and the CQI may reflect SINR information of UE. Therefore, the SINR in the foregoing power update representation form 1 and representation form 2 may be replaced with the CQI, and the CSI reporting content of the SL distributed power control may further include another two content forms, that is, the following content form 3 and content form 4.

In the content form 3, the CSI reporting content includes at least one of the following items. CSI reported by the RX UE j includes a CQI of the RX UE j on a subchannel occupied by the SL target link, and an ISR that is received on the subchannel and that is of an interference RP from each SL interference link to a signal RP from the SL target link.

In the content form 4, CSI reporting content includes at least one of the following items. CSI reported by the RX UE j includes a CQI of a subchannel occupied by the RX UE j on the SL target link, an interference RP that is received on the subchannel and that is from each SL interference link, and a signal RP that is received on the subchannel and that is from the SL target link.

In this embodiment of this application, the RX UE j may perform CSI reporting at a subchannel level in at least one of a unicast manner, a multicast manner, and a broadcast manner. In this embodiment of this application, CSI reporting includes but is not limited to the following two implementations. The following separately describes the two implementations.

In some embodiments of this application, in step S102, the RX UE j detects, on the H1 subchannels of the H subchannels occupied by the SL target link, CSI-RSs sent by at least two TX UEs. The at least two TX UEs include the TX UE j and A TX UEs of other SL transmission pairs, where A is a positive integer less than K.

In Implementation 1, the RX UE j reports, to the A TX UEs and the TX UE j in a unicast, multicast, or broadcast manner, CSI of the H subchannels occupied by the SL target link of the RX UEj.

It should be noted that the RX UE j may report CSI of some of the H subchannels occupied by the SL target link. In an implementation, CSI information reported by the RX UE j may further include third indication information, and the third indication information is used to indicate a subchannel corresponding to the CSI reported by the RX UE j.

In an implementation, the SL preset resource pool includes M subchannels in total. In this case, the third indication information is presented as an M-bit bitmap used to indicate a subchannel corresponding to the CSI reported by the RX UE j in the M subchannels. For example, if an $m^{th}$ bit in the bitmap is set to 1, it indicates that the RX UE j reports CSI of the $m^{th}$ subchannel in the M subchannels.

In this embodiment of this application, the A TX UEs and the RX UE j form A SL interference links, and an $a^{th}$ interference link in the A SL interference links occupies F(a) subchannels in the H subchannels, where F(a) is a positive integer less than or equal to H, and a is a positive integer less than or equal to A.

In Implementation 1, for the content form 1, the CSI reported by the RX UE j may include at least one of the following items: an SINR of the RX UE j on the H1 subchannels, and ISRs that are received on the H1 subchannels and that are of interference RPs of the A TX UEs to a signal RP of the TX UE j. In Implementation 1, for the content form 2, the CSI reported by the RX UE j may include at least one of the following items: an SINR of the RX UE j on the H1 subchannels, a signal RP that is of the TX UE j and that is received on the H1 subchannels, and interference RPs that are of the A TX UEs and that are received on the H1 subchannels. A is a positive integer less than or equal to K.

It may be understood that the SL target link and each (for example, TX UE k, where j≠k) of the A SL interference links multiplex at least one subchannel, and the RX UE j receives interference from the TX UE k on the at least one subchannel.

For CSI reporting content of the RX UE j for the content form 3 in Implementation 1, refer to the CSI reporting content for the content form 1 in Implementation 1. For CSI reporting content of the RX UE j for the content form 4 in Implementation 1, refer to the CSI reporting content for the content form 2 in Implementation 1. Details are not described herein again.

In some embodiments of this application, for the content form 1 of CSI reporting, the RX UE j performs differential reporting on an SINR and an ISR between the subchannels. Specifically, the RX UE j determines a maximum SINR value in the SINRs on the H1 subchannels, and the RX UE j performs quantization encoding on the maximum SINR value, and performs quantization encoding on an SINR difference between an SINR of another subchannel and the maximum SINR value. The RX UE j determines a maximum ISR value in the ISRs corresponding to the H1 subchannels. The ISRs corresponding to the H1 subchannels include: ISRs that are received on the H1 subchannels and that are of the interference RPs of the A TX UEs to the signal RP of the TX UE j. The RX UE j performs quantization encoding on the maximum ISR value, and performs quantization encoding on an ISR difference between another ISR and the maximum ISR value.

Figures 1, 7A:
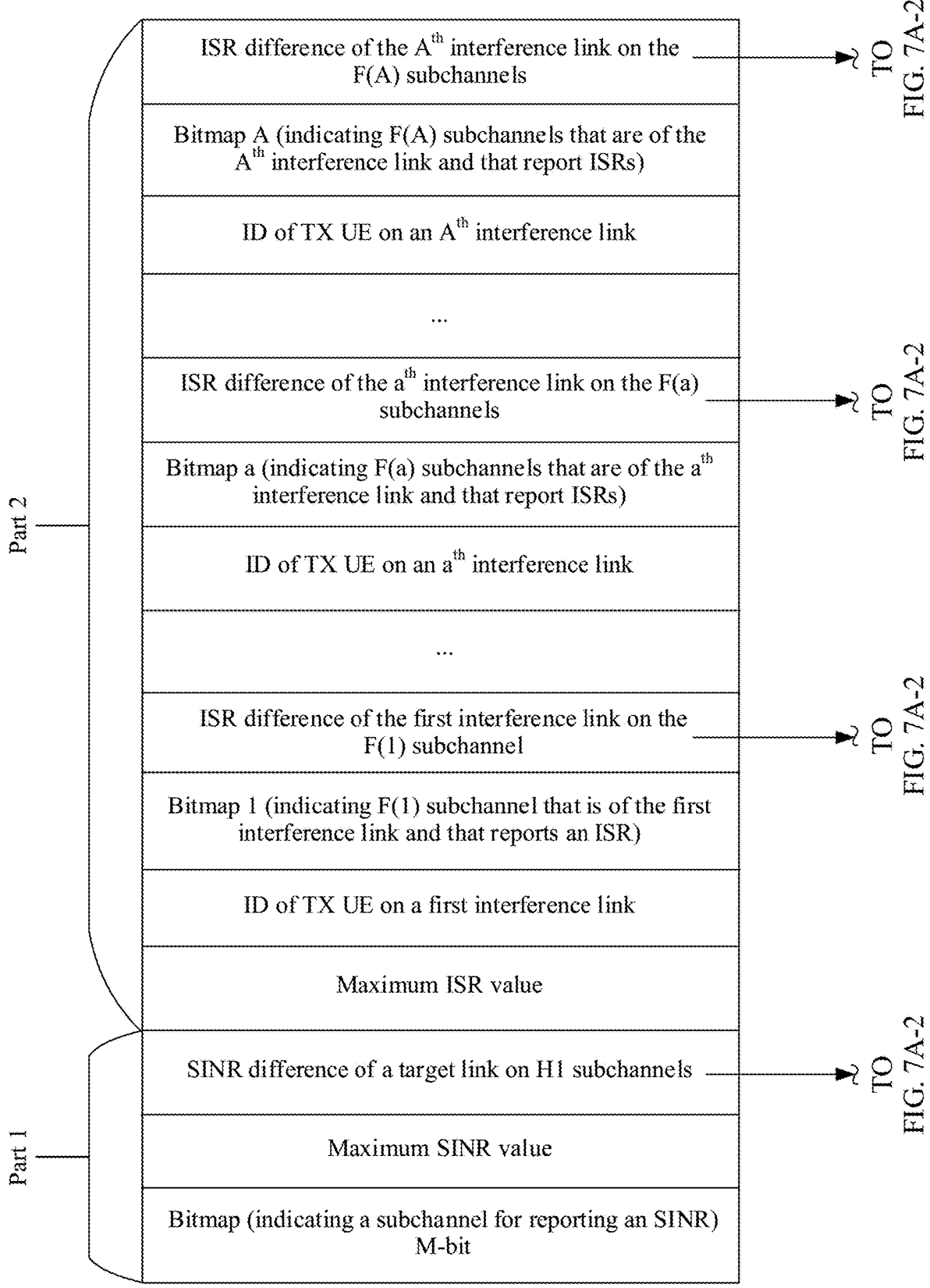
Figures 2, 7A:
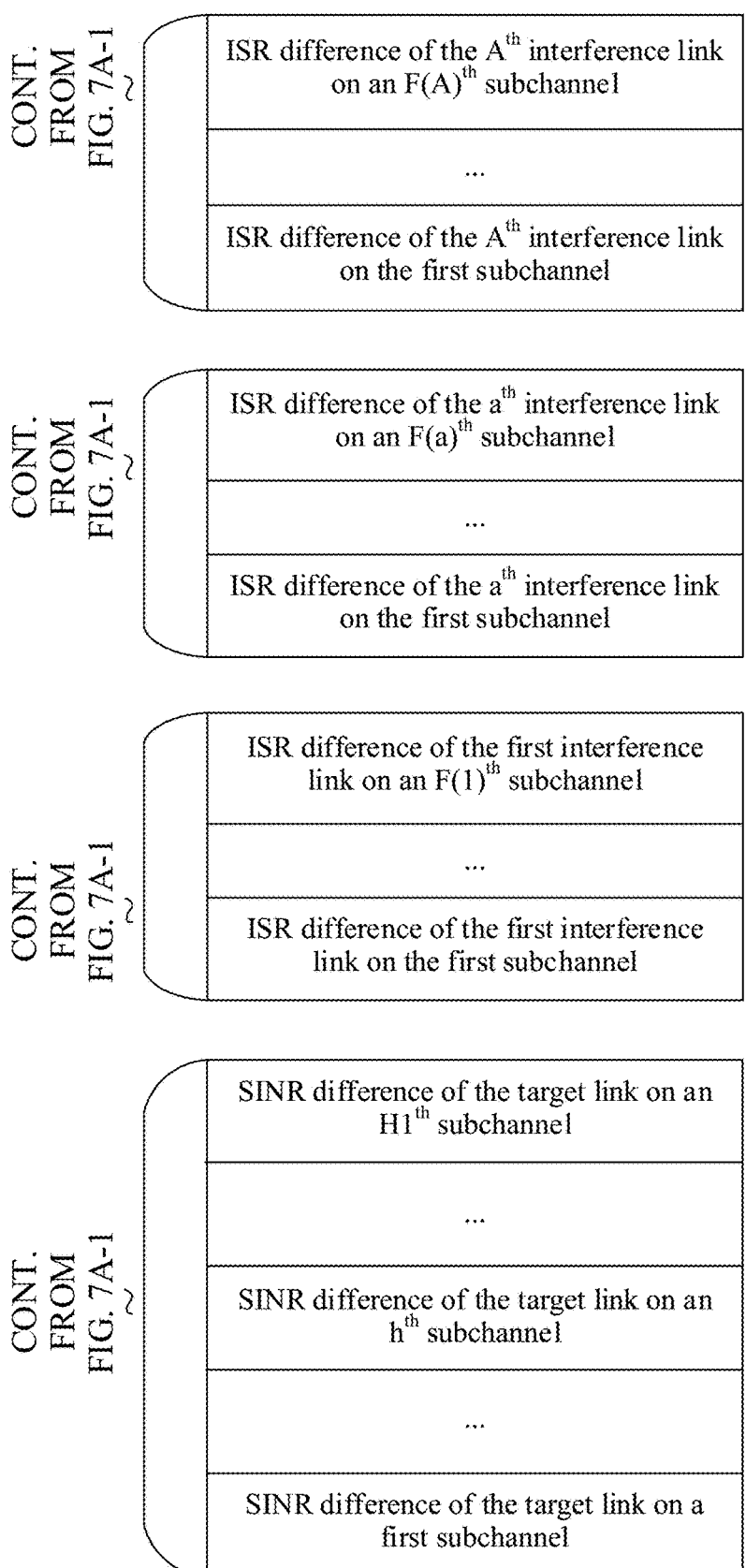

For example, for differential reporting in the content form 1, this embodiment of this application provides a data format for CSI reporting. As shown in FIG. 7A-1 and FIG. 7A-2, CSI reporting content includes a first part and a second part. The first part includes an M-bit bitmap, quantization encoding of the maximum SINR value, and quantization encoding of an SINR difference of each of the H1 subchannels occupied by the RX UE j. The M-bit bitmap is used to indicate a subchannel corresponding to an SINR reported by the RX UE j. The second part includes ISRs respectively corresponding to the A SL interference links on the H1 subchannels. Specifically, the second part includes: quantization encoding of the maximum ISR value, an identity (ID) of TX UE (that is, the $a^{th}$ TX UE) of an $a^{th}$ SL interference link in the A SL interference links, a bitmap a, and quantization encoding of an ISR difference corresponding to the $a^{th}$ TX UE on each of the F(a) subchannels. The bitmap a is used to indicate the F(a) subchannels that are occupied by the $a^{th}$ interference link and that report ISRs. As shown in FIG. 7A-1 and FIG. 7A-2, the SINR and the ISR in the CSI reporting content are encoded independently.

In an implementation, the bitmap a includes H1-bit information, and the bitmap a is used to indicate the F(a) subchannels that are occupied by the $a^{th}$ interference link in the H1 subchannels and that report ISRs. In an implementation, the bitmap a includes M-bit information, and the bitmap a is used to indicate the F(a) subchannels that are occupied by the $a^{th}$ interference link in the M subchannels of the SL preset resource pool and that report ISRs.

In some embodiments of this application, for the content form 2 of CSI reporting, the RX UE j performs differential reporting on an SINR and an RP between the subchannels. Specifically, the RX UE j determines a maximum SINR value in the SINRs on the H1 subchannels, and the RX UE j performs quantization encoding on the maximum SINR value, and performs quantization encoding on an SINR difference between an SINR of another subchannel and the maximum SINR value. The RX UE j determines a maximum RP value in the interference RPs of the A TX UEs and the signal RP of the TX UE j that are received on the H1 subchannels, and the RX UE j performs quantization encoding on the maximum RP value, and performs quantization encoding on an RP difference between another RP and the maximum RP value.

For example, for differential reporting in the content form 2, this embodiment of this application provides a data format for CSI reporting. As shown in FIG. 7B-1 and FIG. 7B-2, CSI reporting content includes a first part and a third part. The third part includes quantization encoding of the maximum RP value, quantization encoding of an RP difference corresponding to a signal RP of the TX UE j received on the H1 subchannels, an identity (ID) of TX UE (that is, the $a^{th}$ TX UE) of an $a^{th}$ SL interference link in the A SL interference links, a bitmap a, and quantization encoding of RP differences corresponding to the interference RPs that are of the A TX UEs and that are received on the H1 subchannels. The bitmap a is used to indicate the F(a) subchannels that are occupied by the $a^{th}$ interference link and that report RPs. For the first part, refer to related descriptions in FIG. 7A-1 and FIG. 7A-2. Details are not described herein again. As shown in FIG. 7B-1 and FIG. 7B-2, the SINR and the RP in the CSI reporting content are encoded independently.

In an implementation, for differential reporting in the content form 1 or the content form 2, 7-bit quantization is performed on a maximum value (for example, the SINR maximum value and the ISP maximum value), and 4-bit quantization is performed on a difference (for example, the SINR difference and the ISP difference).

In some embodiments of this application, for the content form 3 of CSI reporting, the RX UE j performs differential reporting on a CQI and an ISR between the subchannels. For details, refer to differential reporting in the content form 1. Details are not described herein again. For example, FIG.

Figures 1, 7C:
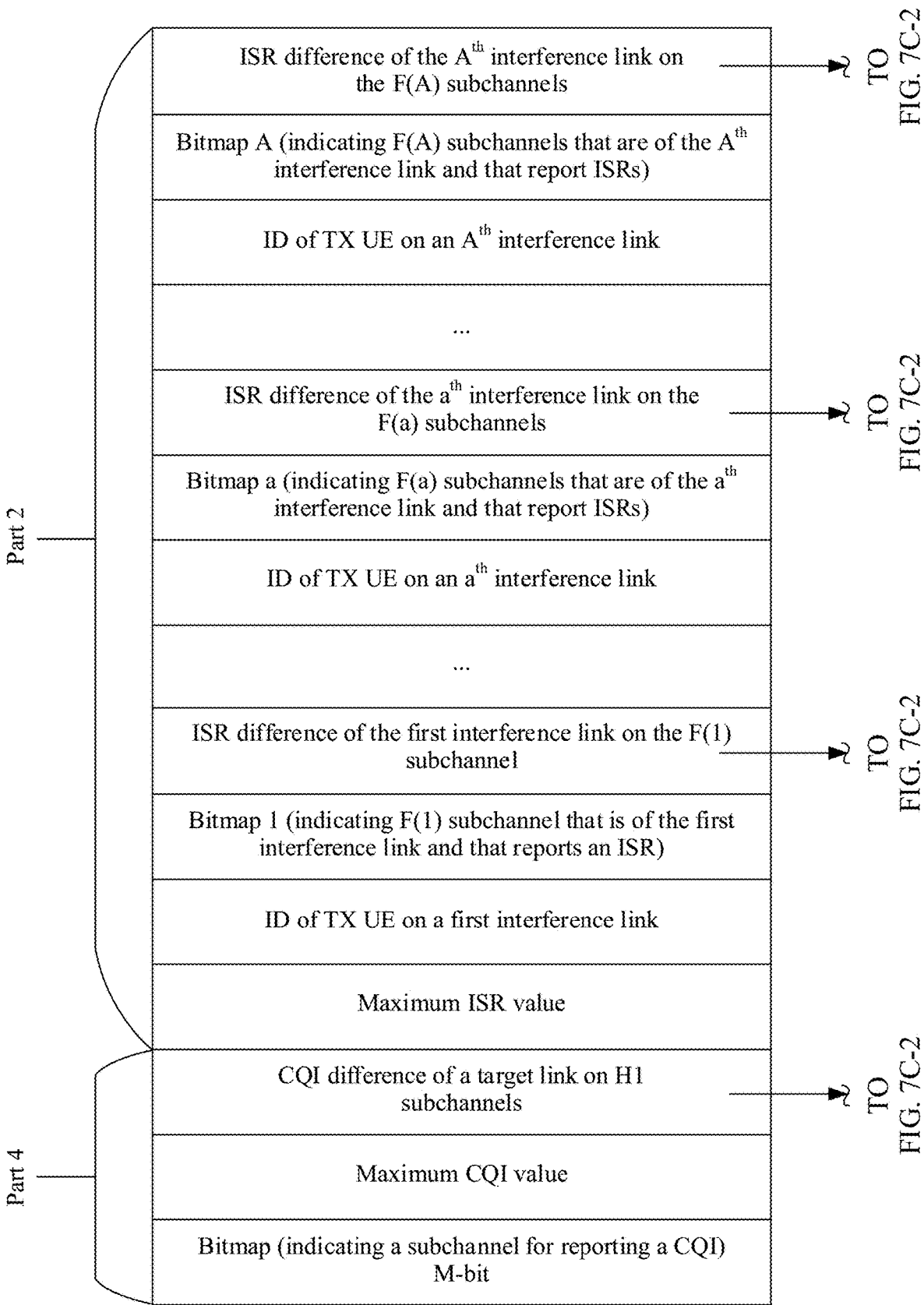
Figures 2, 7C:
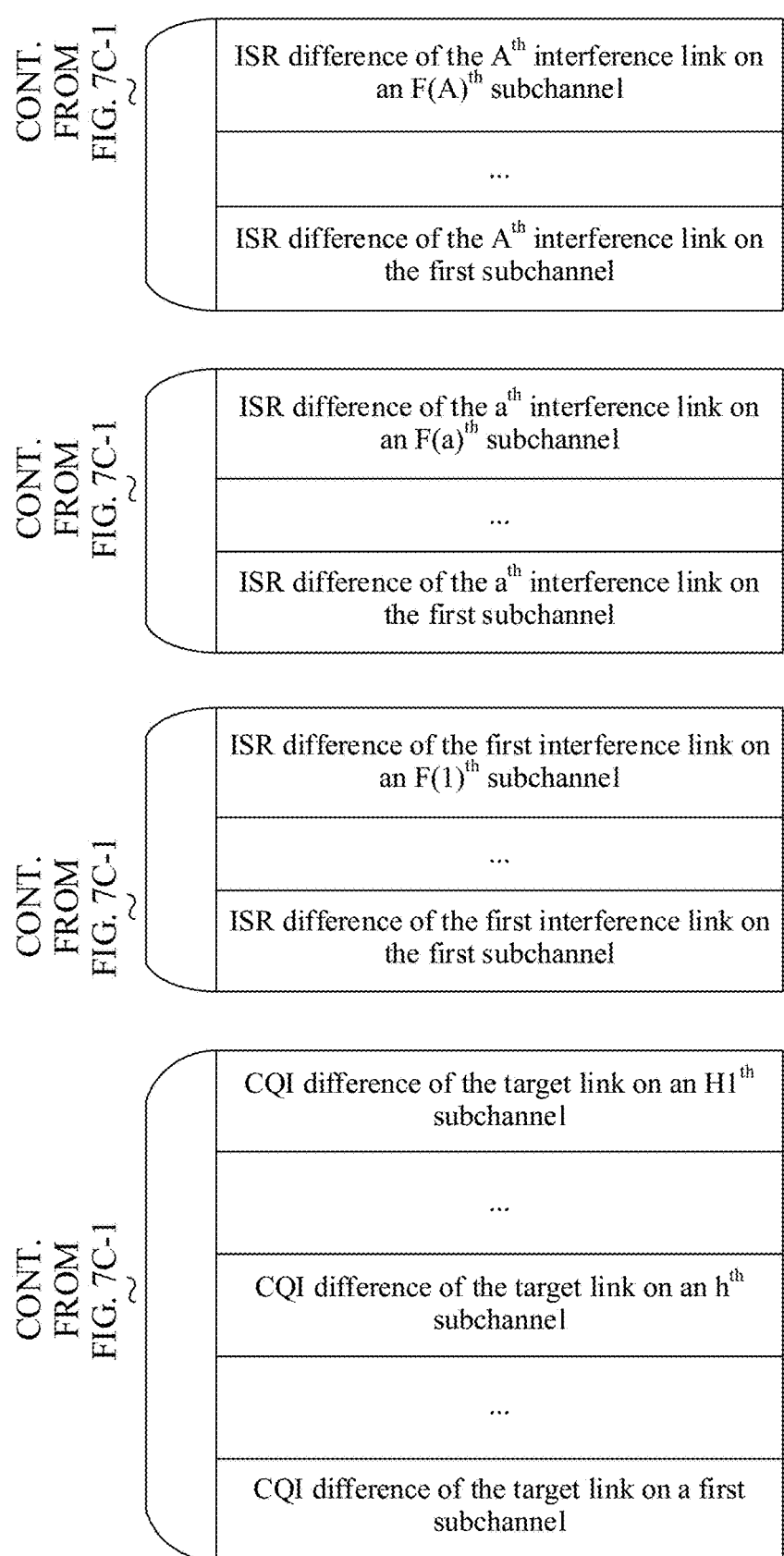

7C-1 and FIG. 7C-2 show a data format of CSI reporting in a content form 3 according to an embodiment of this application. As shown in FIG. 7C-1 and FIG. 7C-2, CSI reporting content includes a fourth part and a second part. The fourth part includes a bitmap, quantization encoding of a maximum CQI value, and quantization encoding of CQI differences of the H1 subchannels occupied by the SL target link of the RX UE j. The bitmap is used to indicate the H1 subchannels on which the RX UE j performs CQI reporting. For the second part, refer to related descriptions in FIG. 7A-1 and FIG. 7A-2. Details are not described herein again.

Figures 1, 7D:
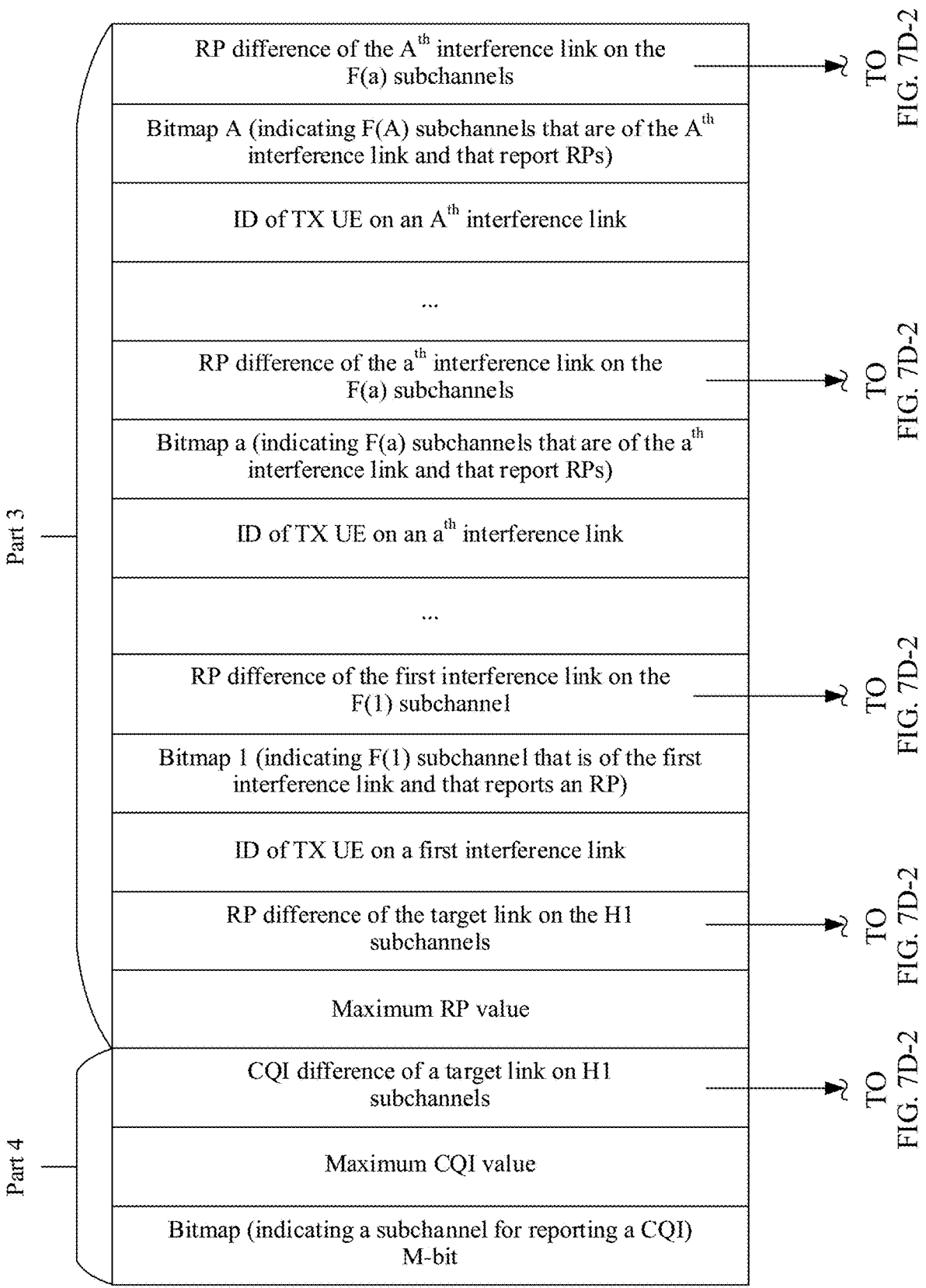

In some embodiments of this application, for the content form 4 of CSI reporting, the RX UE j performs differential reporting on a CQI and an RP between the subchannels. For details, refer to differential reporting in the content form 2. Details are not described herein again. For example, FIG. 7D-1 and FIG. 7D-2 show a data format of CSI reporting in a content form 4 according to an embodiment of this application. As shown in FIG. 7D-1 and FIG. 7D-2, CSI reporting content includes a fourth part and a third part. For the fourth part, refer to related descriptions of FIG. 7C-1 and FIG. 7C-2. For the third part, refer to related descriptions of FIG. 7B-1 and FIG. 7B-2. Details are not described herein again.

In an implementation, for differential reporting in the content form 3 or the content form 4, when the RX UE j performs differential reporting on a CQI and an ISR between the subchannels, 4-bit quantization is performed on a maximum CQI value, 2-bit quantization is performed on a CQI difference, 7-bit quantization is performed on a maximum ISR value, and 4-bit quantization is performed on an ISR difference.

With reference to the foregoing power update representation form 2, it can be learned that, to perform power update, a channel gain of an interference link $h_{kj}[n]$ needs to be obtained, where j≠k. The TX UE k may obtain a channel gain of the SL interference link between the TX UE k and the RX UE j based on the interference RP that is from the TX UE k and that is reported by the RX UE j. In some embodiments of this application, a channel gain change of an interference link is very small in coherence time, and the RX UE j needs to report, only once, an interference RP received by using an SL interference link.

In Implementation 2, the RX UE j separately reports, to the A TX UEs and the TX UE j in a unicast manner, related CSI of a subchannel occupied by the TX UE in the H1 subchannels.

In Implementation 2, for the content form 1, the CSI reported by the RX UE j to the TX UE j in a unicast manner may include SINRs of the H1 subchannels occupied by the SL target link of the RX UE j. The CSI that is reported by the RX UE j to the $a^{th}$ TX UE in the A TX UEs in a unicast manner may include at least one of the following items: SINRs of the F(a) subchannels occupied by the $a^{th}$ interference link in the H1 subchannels, and an ISR of the interference RP that is of the $a^{th}$ TX UE and that is received on the F(a) subchannels to the received signal RP of the TX UE j. In Implementation 1, for the content form 2, the CSI reported by the RX UE j to the TX UE j in a unicast manner may include at least one of the following items: an SINR of the RX UE j on the H1 subchannels, and a signal RP that is of the TX UE j and that is received by the RX UE j on the H1 subchannels. The CSI reported by the RX UE j to the $a^{th}$ TX UE in a unicast manner may include at least one of the following items: an SINR of the RX UE j on the F(a) subchannels, a signal RP that is of the TX UE j and that is received on the F(a) subchannels, and an interference RP that is of the $a^{th}$ TX UE and that is received on the F(a) subchannels.

For CSI reporting content of the RX UE j for the content form 3 in Implementation 2, refer to the CSI reporting content for the content form 1 in Implementation 2. For CSI reporting content of the RX UE j for the content form 4 in Implementation 2, refer to the CSI reporting content for the content form 2 in Implementation 2. Details are not described herein again.

In some embodiments of this application, for the content form 1 of CSI reporting, the RX UE j performs differential reporting on an SINR and an ISR between the subchannels. Specifically, the RX UE j determines a maximum SINR value in the SINRs on the H1 subchannels, and the RX UE j performs quantization encoding on the maximum SINR value, and performs quantization encoding on an SINR difference between an SINR of another subchannel and the maximum SINR value. The RX UE j determines a maximum ISR value in the ISRs corresponding to the F(a) subchannels. The ISRs corresponding to the F(a) subchannels include: an ISR of the interference RP that is of the $a^{th}$ TX UE and that is received on the F(a) subchannels to the signal RP of the TX UE j. The RX UE j performs quantization encoding on the maximum ISR value, and performs quantization encoding on an ISR difference between another ISR and the maximum ISR value.

Figure 7E:
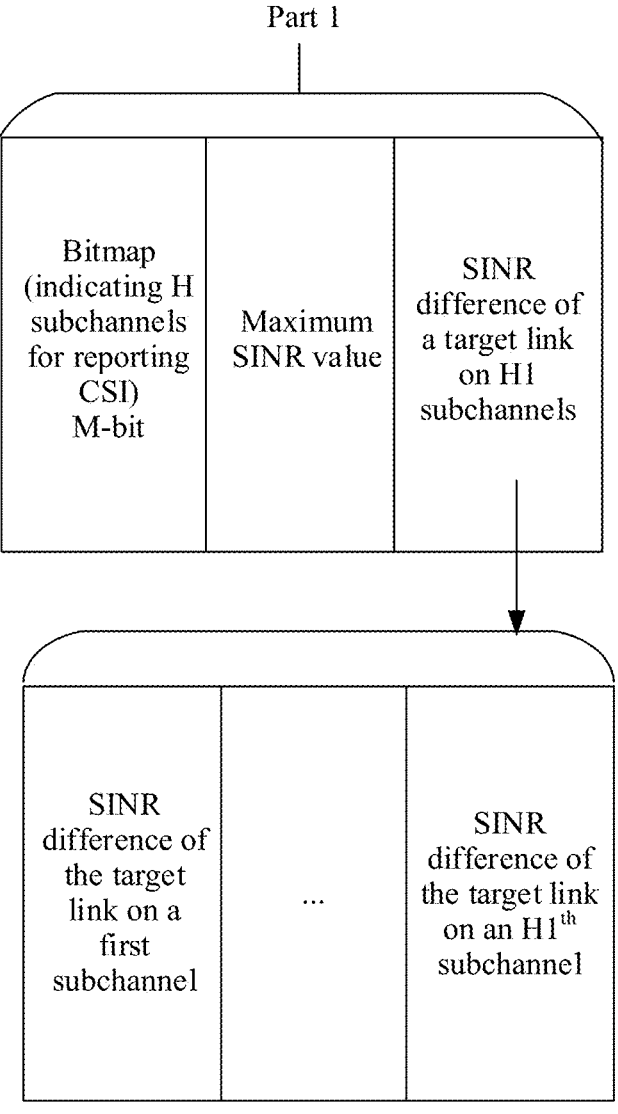
FIG. 7E and FIG. 7F each are a schematic diagram of a CSI data structure in a content form 1 according to an embodiment of this application.
Figure 7F:
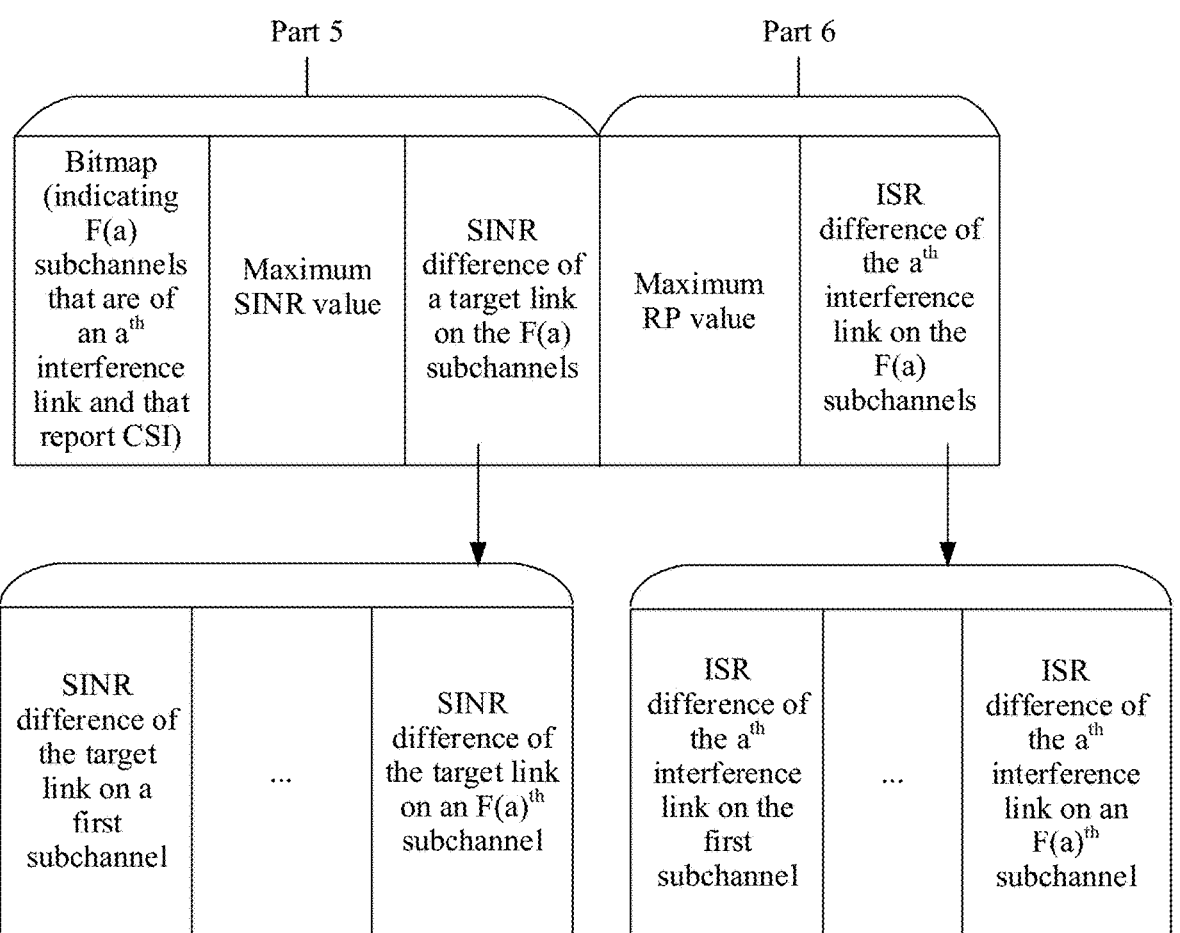

For example, for differential reporting in the content form 1, FIG. 7E shows a data format in which the RX UE j reports CSI to the TX UE j in a unicast manner. As shown in FIG. 7E, for CSI reporting content, refer to the first part of CSI reporting in FIG. 7A-1 and FIG. 7A-2. Details are not described herein again. FIG. 7F shows a data format in which the RX UE j reports CSI to the $a^{th}$ TX UE in a unicast manner. As shown in FIG. 7F, CSI reporting content includes a fifth part and a sixth part. The fifth part includes: a bitmap, quantization encoding of a maximum SINR value, and quantization encoding performed by the RX UE j on an SINR difference of the F(a) subchannels occupied by the $a^{th}$ TX UE. The bitmap is used to indicate the F(a) subchannels on which the $a^{th}$ interfering link performs CSI reporting. The sixth part includes: quantization encoding of a maximum ISR value and quantization encoding of an ISR difference corresponding to the $a^{th}$ TX UE on the F(a) subchannels.

In some embodiments of this application, for the content form 2 of CSI reporting, the RX UE j performs differential reporting on an SINR and an RP between the subchannels. Specifically, for differential quantization coding of the SINR, refer to the foregoing embodiment. Details are not described herein again. The RX UE j determines a maximum RP value in the interference RP that is of the $a^{th}$ TX UE and that is received on the H1 subchannels and the received signal RP of the TX UE j. The RX UE j performs quantization encoding on the maximum RP value, and performs quantization encoding on an RP difference between another RP and the maximum RP value.

Figure 7G:
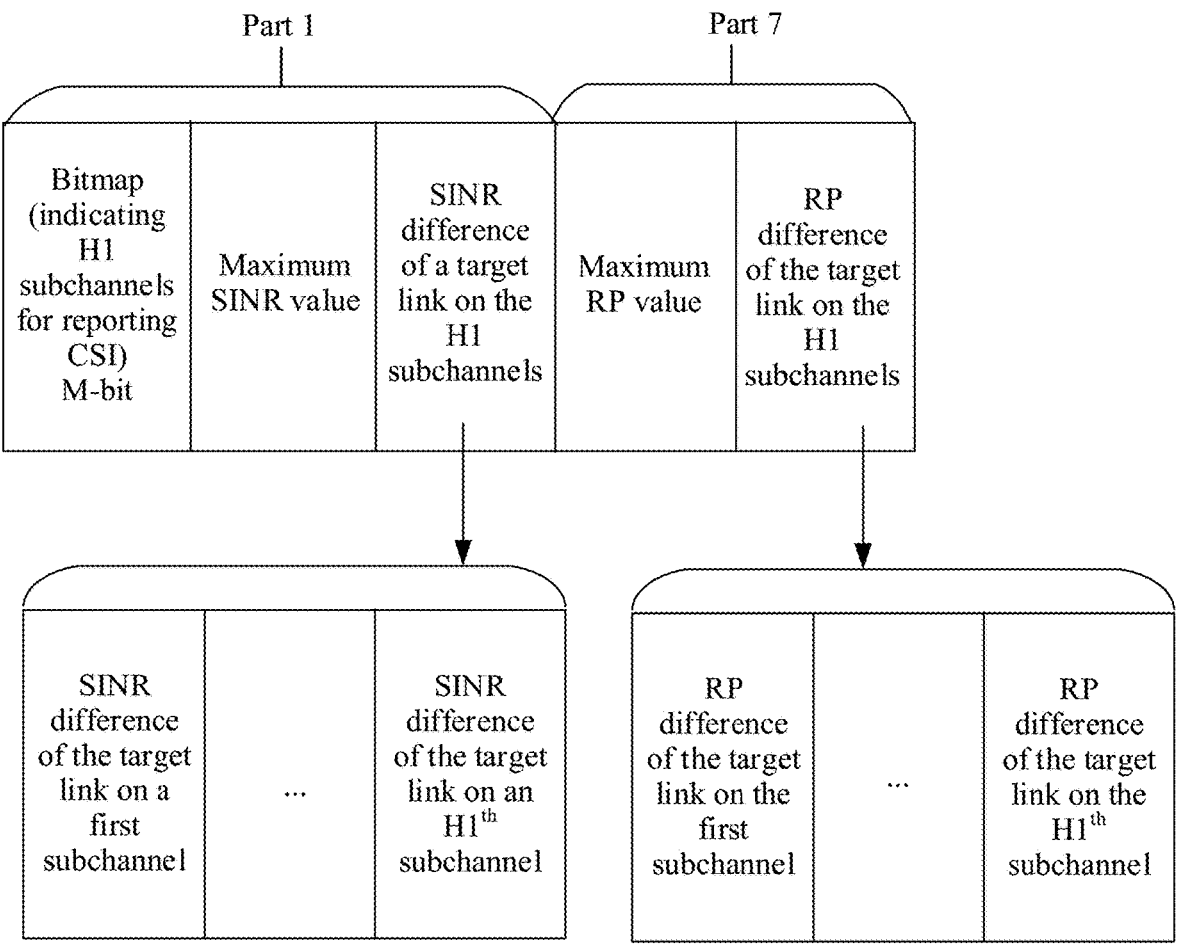
FIG. 7G and FIG. 7H each are a schematic diagram of a CSI data structure in a content form 2 according to an embodiment of this application.
Figure 7H:
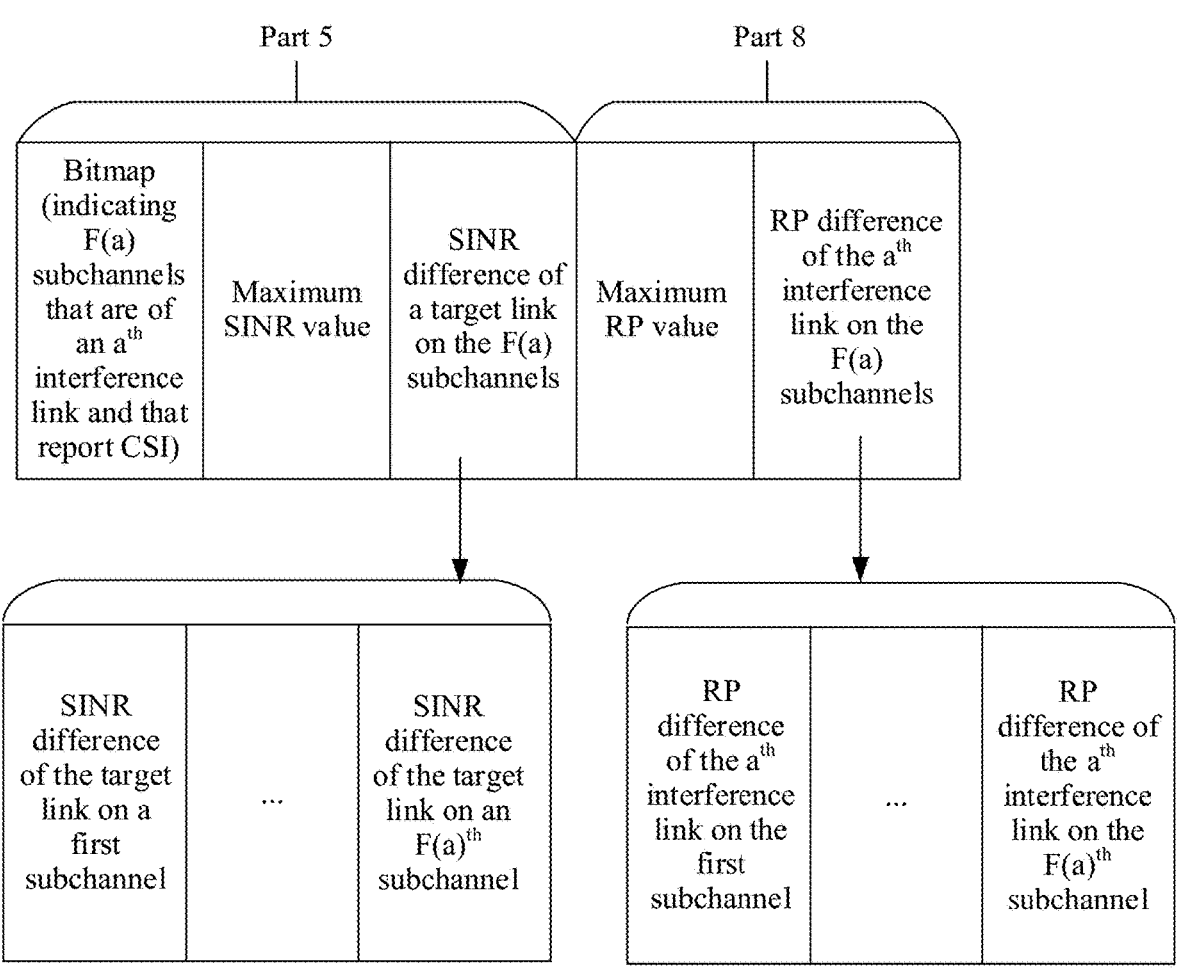

For example, for differential reporting in the content form 2, FIG. 7G shows a data format in which the RX UE j reports CSI to the TX UE j in a unicast manner. FIG. 7G shows a data format in which the RX UE j reports CSI to the $a^{th}$ TX UE in a unicast manner. As shown in FIG. 7G, CSI reporting content includes a first part and a seventh part. For the first part, refer to related descriptions of the first part shown in FIG. 7A-1 and FIG. 7A-2. The seventh part includes quantization encoding of a maximum RP value and quantization encoding of an RP difference corresponding to a signal RP that is of the TX UE j and that is received on the H1 subchannels. FIG. 7H shows a data format in which the RX UE j reports CSI to the $a^{th}$ TX UE in a unicast manner. As shown in FIG. 7H, CSI reporting content includes a fifth part and an eighth part. For the fifth part, refer to related descriptions of the fifth part shown in FIG. 7F. The eighth part includes quantization encoding of a maximum RP value and an RP difference corresponding to an interference RP that is of the $a^{th}$ TX UE and that is received on the F(a) subchannels.

It should be noted that, in addition to the CSI reporting content in the content form 1, the content form 2, the content form 3, or the content form 4, CSI reported by the RX UE j may further include other information, for example, at least one of RI, PTI, or PMI. This is not specifically limited herein.

It may be understood that when the RX UE j reports CSI of a subchannel to the at least one TX UE (for example, the TX UE K) in a unicast manner, data sent by the RX UE j to the TX UE K further includes an identity of the TX UE K. When the RX UE j reports CSI of a subchannel to the at least one TX UE in a multicast manner, data sent by the RX UE j to the at least one TX UE further includes an identity of the at least one TX UE.

In an implementation, CSI reporting content sent by the RX UE j is carried in a media access control control element (Media Access Control Control Element, MAC CE).

Figure 8A:
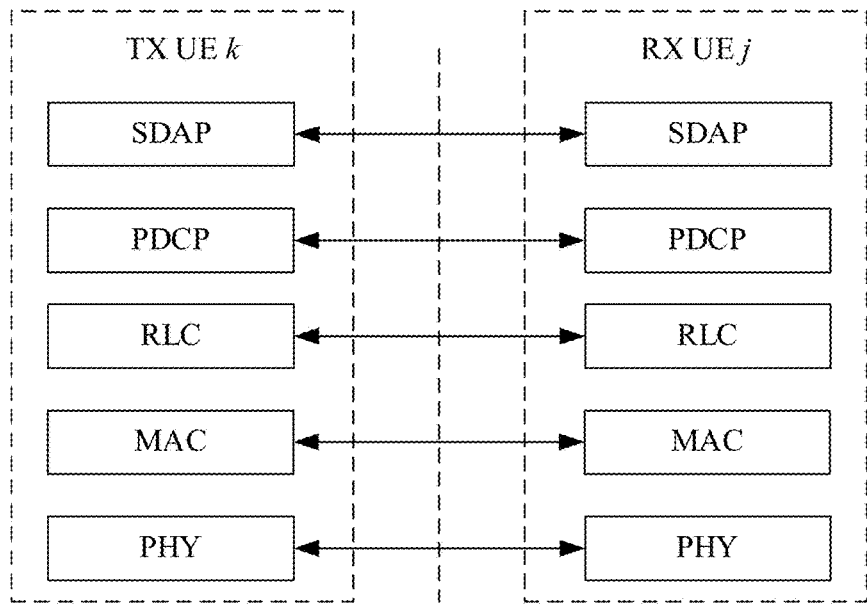
FIG. 8A is a schematic diagram of a user plane protocol architecture according to an embodiment of this application.

FIG. 8A is a schematic diagram of a user plane protocol architecture of 5G NR according to an embodiment of this application. As shown in FIG. 8A, the user plane protocol architecture of 5G NR includes logical function protocol layer such as a service data adaptation protocol (service data adaptation protocol, SDAP) layer, a packet data convergence protocol (packet data convergence protocol, PDCP) layer, a radio link control (radio link control, RLC) layer, a MAC layer, and a physical layer (physical layer, PHY). The SDAP layer provides a QoS flow for a 5G core network. The PDCP layer provides a radio bearer for the SDAP layer. The RLC layer provides an RLC channel for the PDCP layer. The MAC layer provides a logical channel for the RLC layer. The PHY layer provides a transport channel for the MAC layer.

Figure 8B:
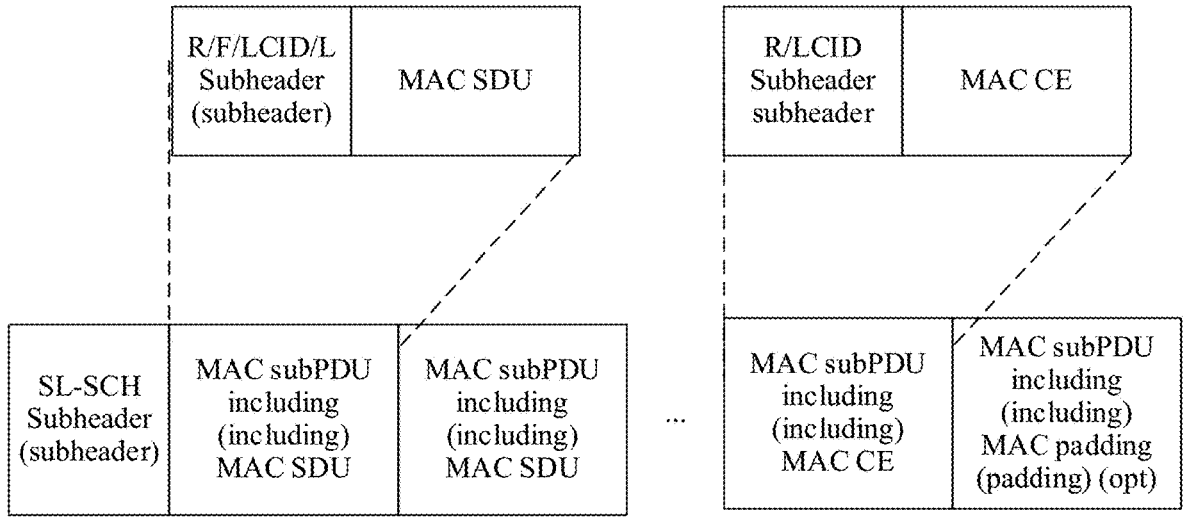
FIG. 8B is a schematic diagram of a structure of a MAC PDU according to an embodiment of this application.

In an implementation, the RX UE j may carry CSI reporting content in a media access control control element (Media Access Control Control Element, MAC CE), and obtain a MAC sub-protocol data unit (sub-Protocol Data Unit, subPDU) by adding a MAC subheader (subheader) to the MAC CE. A MAC PDU includes one or more MAC subPDUs, and the RX UE j transmits the MAC PDU to the PHY layer and then sends the MAC PDU to the TX UE k on a PSSCH. After receiving the PSSCH sent by the RX UE j, a PHY of the TX UE k decodes the PSSCH and transfers a decoded PSSCH to a MAC layer. After removing the MAC subheader, the MAC layer may obtain the CSI reporting content sent by the RX UE j. For example, FIG. 8B is a schematic diagram of a structure of a MAC PDU according to an embodiment of this application.

In some embodiments of this application, the RX UE j reports CSI to the at least one TX UE and sends second indication information, where the second indication information is used to indicate that the RX UE j reports the CSI.

Optionally, the second indication information is a preset field in second SCI sent by the RX UE j, and when the preset field is set to a preset value, the second indication information is used to indicate that the RX UE j reports the CSI. For example, the second indication information is a 1-bit trigger preset in the SCI. If the trigger is set to 1, it indicates that the RX UE j reports the CSI; or if the trigger is set to 0, it indicates that the RX UE j does not report the CSI. It should be noted that after receiving the data sent by the RX UE j, the TX UE determines, based on the preset field in the second SCI sent by the RX UE j, whether the RX UE j reports the CSI. When it is determined that the RX UE j reports the CSI, the TX UE may detect the data sent by the RX UE j, to obtain the CSI reported by the RX UE j.

Optionally, the second indication information is a service ID configured at a MAC layer. When the service ID configured at the MAC layer includes a service ID reported in the CSI, it indicates that the RX UE j reports the CSI. It should be noted that, after receiving the data sent by the RX UE j, the TX UE obtains, through decoding, the service ID configured at the MAC layer. When the service ID configured at the MAC layer matches the service ID reported in the CSI, the TX UE determines that the RX UE j reports the CSI. The TX UE detects the data sent by the RX UE j, to obtain the CSI reported by the RX UE j.

Optionally, the service ID reported in the CSI is a destination Layer-2 ID.

It may be understood that the RX UE may indicate the CSI reporting by using the second indication information, so that TX UE interested in the CSI reporting receives the CSI reporting content.

It should be noted that, in this embodiment of this application, the TX UE may send a CSI-RS in the following three manners: periodic sending, semi-persistent sending, and aperiodic sending; and the RX UE may report CSI in the following three manners: periodic reporting, semi-persistent reporting, and aperiodic reporting. This is not specifically limited in this embodiment of this application. Generally, when CSI is configured to be periodically reported, a CSI-RS can only be configured to be periodically sent. Alternatively, when CSI is configured to be semi-persistently reported, a CSI-RS may be configured to be periodically sent or semi-persistently sent. Alternatively, when CSI is configured to be aperiodically reported, a CSI-RS may be configured to be periodically sent, semi-persistently sent, or aperiodically sent.

S104: The TX UE k updates transmit powers of the N subchannels based on the CSI reported by the RX UE j.

In this embodiment of this application, the TX UE k updates the transmit powers of the N subchannels based on CSI reporting information of a plurality of RX UEs j. Specifically, for how to update the transmit powers of the N subchannels based on the CSI reported by the RX UEs, refer to the power update expression shown in the foregoing representation form 1 or representation form 2. Details are not described herein again.

It should be noted that the RX UE j may receive only CSI-RSs sent by TX UEs of some SL transmission pairs in the K SL transmission pairs. The TX UE k may receive only CSI reported by RX UEs of some SL transmission pairs in the K SL transmission pairs, and update a transmit power of each subchannel based on the CSI reported by the RX UEs of the some SL transmission pairs. In an implementation, the TX UE k may set a value of CSI information that is not obtained in the power update expression in the foregoing representation 1 or representation 2 to 0. For example, the TX UE k does not receive an SINR that is of the $n^{th}$ subchannel and that is fed back by the RX UE j, and when the TX UE k performs power update by using the power update expression in the foregoing representation form 1, the TX UE k may set a value of $SINR_j^{(t)}[n]$ to 0.

S105: The TX UE k selects a subchannel whose power is greater than a preset threshold to send user data.

In some embodiments, the TX UE k selects a subchannel whose power is greater than the preset threshold to send user data and a second CSI-RS.

In some embodiments, when selecting a subchannel whose power is greater than the preset threshold to send user data to the RX UE k, the TX UE k indicates, by using fourth indication information, a subchannel occupied by the TX UE k. Subchannels occupied by the TX UE k may be consecutive or inconsecutive in frequency domain.

For example, the foregoing preset threshold is equal to 0.

In some embodiments, after step S105, steps S103 to S105 may continue to be performed. In other words, the RX UE may report CSI again based on the CSI-RS sent by the TX UE. Then, the TX UE may update transmit powers of the subchannels again based on the CSI reported by the plurality of RX UEs, so that the transmit powers of the subchannels are further optimized and a system capacity is effectively improved.

Figure 9A:
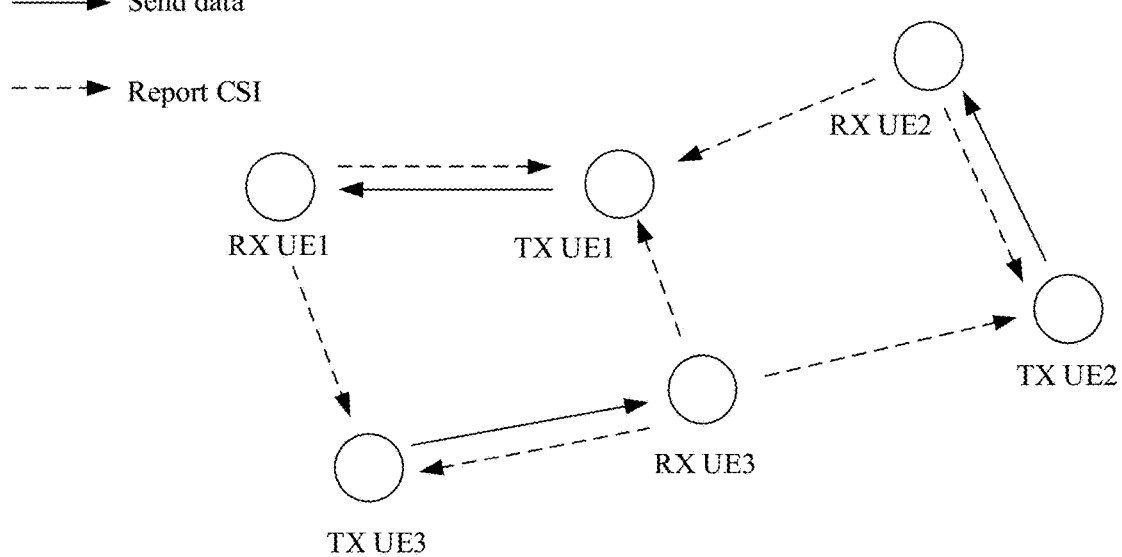
FIG. 9A is a schematic diagram of 3 SL transmission pairs according to an embodiment of this application.
Figure 9B:
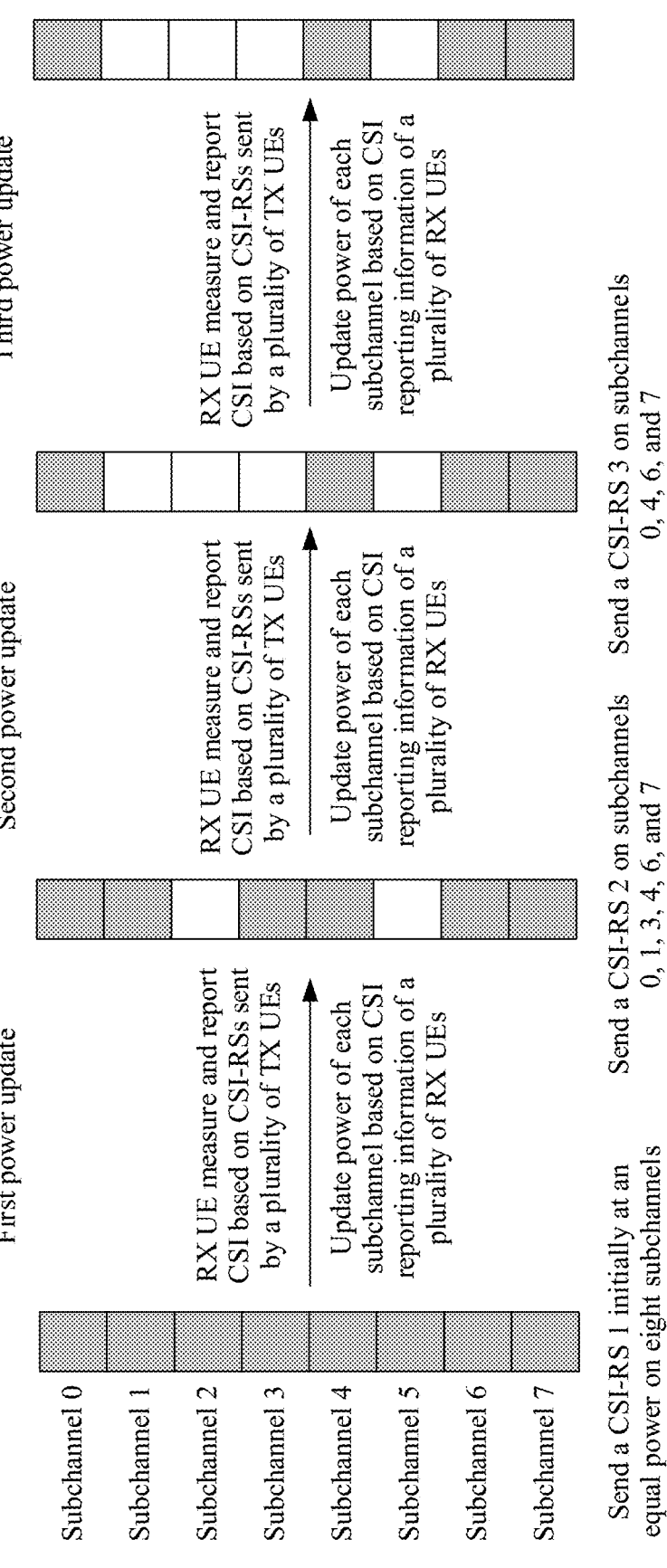
FIG. 9B is a schematic diagram of updating a power according to an embodiment of this application.

For example, as shown in FIG. 9A, the communication system 100 includes three SL transmission pairs, and an SL preset resource pool includes eight subchannels (that is, a subchannel 0 to a subchannel N) shown in FIG. 9B. TX UE 1 is transmitting user data to RX UE 1 on at least one of the eight subchannels, and TX UE 2 is transmitting user data to RX UE2 on at least one of the eight subchannels. Each RX UE may determine CSI based on a received CSI-RS, and report the CSI in at least one of a unicast manner, a multicast manner, or a broadcast manner.

As shown in FIG. 9A and FIG. 9B, when initially sending data, TX UE 3 sends a CSI-RS 1 at an equal power on the foregoing eight subchannels. The RX UE 1 and RX UE 3 that are spatially close to the TX UE 3 may detect the CSI-RS 1 sent by the TX UE 3, and the RX UE 2 that is spatially far away from the TX UE 3 does not detect the CSI-RS 1 sent by the TX UE 3. The RX UE 1 and the RX UE 3 perform CSI reporting at a subchannel level based on the CSI-RS 1 sent by the TX UE 3, and the TX UE 3 may detect CSI reported by the RX UE 1 and the RX UE 3. The TX UE 3 performs a first power update on transmit powers of the eight subchannels based on the CSI reported by the RX UE 1 and the RX UE 3, where transmit powers of a subchannel 2 and a subchannel 5 in the eight subchannels are updated to 0. Then, the TX UE 3 selects subchannels (that is, subchannel 0, subchannel 1, subchannel 3, subchannel 4, subchannel 6, and subchannel 7) whose updated transmit powers are greater than 0 to send user data and a CSI-RS 2. Then, the RX UE 1 and/or the RX UE 3 perform CSI reporting at a subchannel level based on the detected CSI-RS 2. The TX UE 3 performs a second power update on the transmit powers of the subchannels based on CSI reported by the RX UE 1 and/or the RX UE 3, and selects subchannels (that is, the subchannel 0, the subchannel 4, the subchannel 6, and the subchannel 7) whose transmit powers are greater than 0 to send data and a CSI-RS 3. The rest can be deduced by analogy.

It should be noted that, after a plurality of times of iterative updates, the system capacity tends to reach an optimal value, and subchannels occupied by the TX UE k no longer change. As shown in FIG. 9B, after a third power update and a fourth power update (not shown in the figure), subchannels occupied by the TX UE 3 are the same.

In some embodiments, after performing an $Imax^{th}$ iterative update on the transmit powers of the subchannels, the TX UE k stops iterative update, and sends data based on transmit powers obtained through the $Imax^{th}$ iterative update. Imax may represent a preset maximum quantity of power iterative update times. In some embodiments, when a difference between a system capacity obtained after an $i^{th}$ iterative update and a system capacity obtained after an $(i-1)^{th}$ iterative update is less than a preset difference, the TX UE k stops iterative update, and sends data based on transmit powers obtained through the $i^{th}$ iterative update.

In the foregoing example, the RX UE 1 and the RX UE 3 that are spatially close to the TX UE 3 may detect the CSI-RS 1 sent by the TX UE 3, and the RX UE 2 that is spatially far away from the TX UE 3 does not detect the CSI-RS 1 sent by the TX UE 3. It should be noted that whether the RX UE can detect the CSI-RS 1 sent by the TX UE 3 is not only affected by a spatial distance, but also affected by many other factors (for example, whether there is an obstacle between the RX UE and the TX UE 3). The foregoing example is merely described by using a spatial distance as an example, and is not absolute. The foregoing example does not constitute a limitation on this embodiment of this application.

In addition, it can be learned from the related embodiment of the SL data transmission method shown in FIG. 6 that, in this embodiment of this application, resource scheduling may be performed on a time-frequency resource in the preset resource pool by using a subchannel as a unit. The RX UE performs CSI reporting on each subchannel, to implement distributed power control on the subchannels in the preset resource pool. In addition, a subchannel whose power is greater than 0 is selected to perform SL communication.

In some embodiments, resource scheduling may be further performed on a time-frequency resource in the preset resource pool by using a subband as a unit. The RX UE performs CSI reporting at a subband level, to implement distributed power control on a subband in the preset resource pool. In addition, a subband whose power is greater than 0 is selected to perform SL communication.

Figure 10:
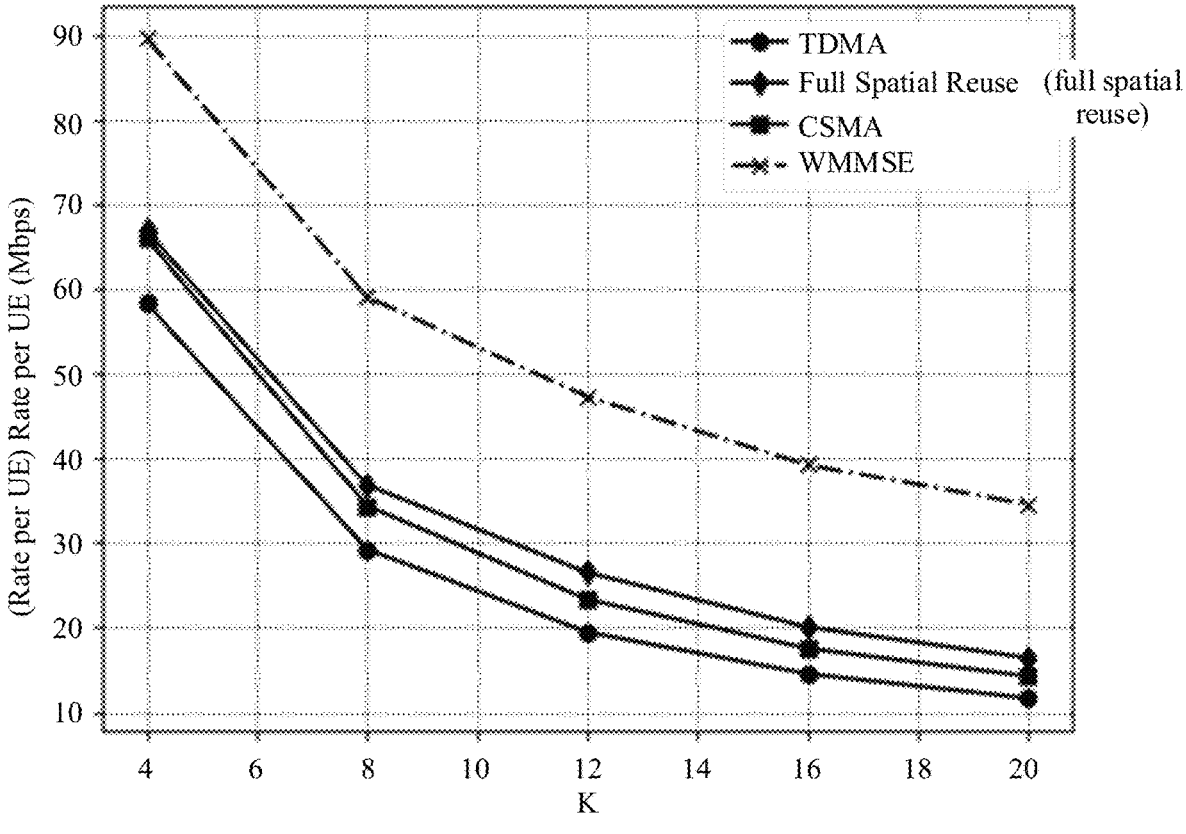
FIG. 10 is a diagram of performance comparison between a plurality of resource reuse mechanisms according to an embodiment of this application.

For example, based on simulation parameters in Table 1, FIG. 10 compares system capacity performance in different resource reuse mechanisms, where TX UEs are evenly distributed in a range of 100 m×100 m, and RX UEs are evenly distributed in a range of 2 m to 20 m corresponding to the TX UEs. In FIG. 10, several compared resource reuse mechanisms include: (1) time division multiple access (Time Division Multiple Access, TDMA), that is, a mechanism in which each SL transmission pair is transmitted in different slots and occupies same duration; (2) full spatial reuse (Full Spatial Reuse), that is, a mechanism in which all SL transmission pairs are transmitted in a same slot and occupy a full bandwidth; (3) CSMA, that is, a mechanism in which before sending data, the TX UE determines interference intensity by detecting channel energy, and when the interference intensity is lower than a preset energy threshold (which is set to −76 dBm in simulation), the TX UE and another TX UE may simultaneously send data, or when interference intensity is greater than or equal to a preset energy threshold, the TX UE and another TX UE are controlled to perform sending in different slots; and (4) WMMSE, that is, a resource reuse mechanism that is implemented through distributed power control and that is proposed in the solution of the present invention based on a WMMSE model. In FIG. 4, a horizontal coordinate represents a quantity of transmission pairs, and a vertical coordinate represents an average reachable rate of each transmission pair. Table 2 shows a performance gain of the solution of the present invention compared with that of the CSMA mechanism. It can be seen from simulation results in FIG. 10 and Table 2 that, compared with the other three resource reuse mechanisms, the solution of the present invention can significantly improve a system capacity. Similar to that in the CSMA mechanism, in a spontaneous resource selection mechanism based on resource sensing in the foregoing solution 1, resource reuse is also performed based on interference measurement, and a problem the same as that in the CSMA mechanism exists. An optimal system capacity cannot be reached.

TABLE 1

| Simulation parameters | |
| --- | --- |
| Carrier frequency | 6 GHz |
| Bandwidth | 20 MHz |
| Subcarrier spacing | 30 kHz |
| Maximum TX UE transmit power $P_{max}$ | 40 mW |
| Quantity of subchannels | 13 |
| Quantity of RBs of each subchannel | 4 |
| Channel model | UMi - Street Canyon; TDL-A |
| Noise power spectrum density | −174 dBm/Hz |

TABLE 2

| Performance gain of the solution of the present invention compared with that of the CSMA mechanism | | | | | |
| --- | --- | --- | --- | --- | --- |
| Quantity of transmission pairs | 4 | 8 | 12 | 16 | 20 |
| Performance gains | 35.81% | 71.85% | 102.83% | 123.61% | 142.03% |

In conclusion, in the proposed SL data transmission solution, a distributed resource reuse mechanism is performed to maximize a system capacity, and the RX UE performs CSI measurement and reporting, to implement distributed power control. In this way, resource reuse between a plurality of SL transmission pairs and spectrum efficiency are effectively improved, and system capacity performance similar to centralized control is implemented.

In this embodiment of this application, the first transmit end may be the TX UE k in the foregoing embodiment, the first receive end may be the RX UE j in the foregoing embodiment, and the first CSI may be CSI that is of each subchannel and that is reported by the RX UE j in an optional embodiment of step S103.

According to the method provided in embodiments of this application, this application further provides a computer program product. The computer program product includes computer program code. When the computer program code is run on a computer, the computer is enabled to perform the method in the foregoing embodiments. Embodiments in this application may alternatively be combined with each other.

According to the method provided in embodiments of this application, this application further provides a computer-readable medium. The computer-readable medium stores program code. When the program code is run on a computer, the computer is enabled to perform the method in the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the processes or functions according to embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. The computer-readable storage medium may be any usable medium accessible by a computer, or a data storage device, such as a server or a data center, integrating one or more usable media.

A person of ordinary skill in the art may understand that all or some of the processes of the methods in embodiments may be implemented by a computer program instructing relevant hardware. The program may be stored in a computer-readable storage medium. When the program is executed, the processes of embodiments of the foregoing methods may be included. The storage medium may include: a magnetic disk, an optical disc, a read-only memory (Read-Only Memory, ROM), or a random access memory (Random Access Memory, RAM).

In the foregoing specific implementations, the objectives, technical solutions, and benefits of embodiments of the present invention are further described in detail. It should be understood that the foregoing descriptions are merely specific implementations of embodiments of the present invention, but are not intended to limit the protection scope of embodiments of present invention. Any modification, equivalent replacement, or improvement made based on technical solutions of embodiments of the present invention shall fall within the protection scope of embodiments of the present invention.

What is claimed is:

1. A first transmitting terminal, comprising:
a processor; and
a memory coupled to the processor and configured to store programming instructions that, when executed by the processor, cause the first transmitting terminal to:
   send a first channel state information-reference signal (CSI-RS) in N frequency domain units, wherein N is a positive integer,
   detect channel state information (CSI) received from K receiving terminals by:
      detecting second indication information received from a jth receiving terminal in the K receiving terminals, wherein the second indication information indicates that the jth receiving terminal has reported a CSI, and j is a positive integer less than or equal to K, and
      detecting a first CSI from data received from the jth receiving terminal based on the second indication information, wherein the CSI received from the K receiving terminals is based on the first CSI-RS, and K is greater than or equal to 2,
   update transmit powers in the N frequency domain units based on all or some of the CSI received from the K receiving terminals,
   send user data based on the updated transmit powers in the N frequency domain units.

2. The terminal according to claim 1, wherein sending the user data based on the updated transmit powers in the N frequency domain units comprises:
   when the updated transmit powers of F frequency domain units in the N frequency domain units are greater than a preset threshold, sending the user data in at least one of the F frequency domain units, wherein:
      F is less than or equal to N and N is greater than or equal to two, or
      F is equal to N and N is equal to one.

3. The terminal according to claim 2, wherein the sending the user data in at least one of the F frequency domain units comprises:
   sending first user data and fourth indication information in the at least one of the F frequency domain units, wherein
      the fourth indication information indicates the at least one of the F frequency domain units in which the first transmitting terminal sends the user data, and
      when the first user data and the fourth indication information are sent in at least two of the F frequency domain units, any two of the at least two of the F frequency domain units are consecutive or inconsecutive in frequency domain.

4. The terminal according to claim 1, wherein sending the first CSI-RS in the N frequency domain units comprises:
   sending first indication information and the first CSI-RS in the N frequency domain units, wherein the first indication information indicates a time-frequency resource location of the first CSI-RS; or
   sending the first CSI-RS in the N frequency domain units according to a predefined rule, wherein the predefined rule indicates the time-frequency resource location of the first CSI-RS.

5. The terminal according to claim 1, wherein
   the second indication information is a preset field in a second Sidelink Control Information (SCI) received from the $j^{th}$ receiving terminal; or
   the second indication information is a service identifier that is reported in a second SCI and that is configured at a media access control (MAC) layer.

6. The terminal according to claim 1, wherein the first CSI comprises third indication information that indicates a frequency domain unit corresponding to the first CSI reported by the $j^{th}$ receiving terminal.

7. The terminal according to claim 1, wherein:
   the CSI received from the K receiving terminals comprises the first CSI received from the $j^{th}$ receiving terminal in the K receiving terminals; and
   the first CSI comprises at least one of the following items:
      a signal to interference plus noise ratio (SINR) of the $j^{th}$ receiving terminal in H1 frequency domain units in frequency domain units occupied by a target link of the $j^{th}$ receiving terminal, or
      an interference to signal ratio (ISR) that is received in h frequency domain units of the H1 frequency domain units and that is of an interference received power (RP) of the first transmitting terminal to a signal RP of a target transmitting terminal, wherein H1 is greater than or equal to 1, and h is greater than or equal to 1 and less than or equal to H1.

8. The terminal according to claim 1, wherein:
   the CSI received from the K receiving terminals comprises the first CSI received from the $j^{th}$ receiving terminal in the K receiving terminals; and
   the first CSI comprises at least one of the following items:
      a channel quality indicator (CQI) of the $j^{th}$ receiving terminal in H1 frequency domain units in frequency domain units occupied by a target link of the $j^{th}$ receiving terminal, or
      an interference to signal ratio (ISR) that is received in h frequency domain units of the H1 frequency domain units and that is of an interference received power (RP) of the first transmitting terminal to a signal RP of a target transmitting terminal, wherein H1 is greater than or equal to 1, and h is greater than or equal to 1 and less than or equal to H1.

9. The terminal according to claim 1, wherein:

the CSI received from the K receiving terminals comprises the first CSI received from the j$^{th}$ receiving terminal in the K receiving terminals; and the first CSI comprises at least one of the following items:

a signal to interference plus noise ratio (SINR) of the j$^{th}$ receiving terminal in H1 frequency domain units in frequency domain units occupied by a target link, an interference received power (RP) that is of the first transmitting terminal and that is received in h frequency domain units of the H1 frequency domain units, or a signal RP that is of a target transmitting terminal and that is received in the H1 frequency domain units, wherein H1 is greater than or equal to 1, and h is greater than or equal to 1 and less than or equal to H1.

10. The terminal according to claim 1, wherein:

the CSI received from the K receiving terminals comprises the first CSI received from the j$^{th}$ receiving terminal in the K receiving terminals; and the first CSI comprises at least one of the following items:

a channel quality indicator (CQI) of the j$^{th}$ receiving terminal in H1 frequency domain units in frequency domain units occupied by a target link, an interference received power (RP) that is of the first transmitting terminal and that is received in h frequency domain units of the H1 frequency domain units, or a signal RP that is of a target transmitting terminal and that is received in the H1 frequency domain units, wherein H1 is greater than or equal to 1, and h is greater than or equal to 1 and less than or equal to H1.

11. A first receiving terminal, comprising:

a processor; and a memory coupled to the processor and storing programming instructions that, when executed by the processor, cause the first receiving terminal to:

detect channel state information-reference signals (CSI-RSs) received from L transmitting terminals in H1 frequency domain units in frequency domain units occupied by a target link, wherein L is greater than or equal to 2, and H1 is greater than or equal to 1, and send first channel state information (CSI) of the H1 frequency domain units based on the CSI-RSs received from the L transmitting terminals, wherein the first CSI is configured to be used by the L transmitting terminals to update transmit powers of the H1 frequency domain units, wherein the CSI-RSs received from the L transmitting terminals comprise a first CSI-RS received from a first transmitting terminal, and detecting the channel state information-reference signals CSI-RSs received from the L transmitting terminals in the H1 frequency domain units in the frequency domain units occupied by the target link comprises:

detecting first indication information received from the first transmitting terminal, wherein the first indication information indicates a time-frequency resource location of the first CSI-RS, wherein the first indication information is a preset field in a first sidelink control information (SCI), and detecting the first CSI-RS in h frequency domain units in the H1 frequency domain units based on the first indication information, wherein h is greater than or equal to 1 and less than or equal to H1, or detecting the first CSI-RS received from the first transmitting terminal according to a predefined rule in the h frequency domain units in the H1 frequency domain units, wherein the predefined rule indicates the time-frequency resource location of a CSI-RS received from the first transmitting terminal.

12. The terminal according to claim 11, wherein the sending the first CSI of the H1 frequency domain units comprises:

sending second indication information and the first CSI of the H1 frequency domain units, wherein the second indication information indicates that the first receiving terminal has reported the CSI.

13. The terminal according to claim 12, wherein the second indication information is a preset field in a second SCI, wherein the second SCI is received from the first receiving terminal; or the second indication information is a service identifier that is reported in the CSI and that is configured at a media access control layer (MAC) layer.

14. The terminal according to claim 11, wherein the first CSI comprises at least one of the following items:

a signal to interference plus noise ratio (SINR) of the first receiving terminal in the H1 frequency domain units; or an interference to signal ratio (ISR) that is received in the h frequency domain units and that is of an interference received power (RP) of the first transmitting terminal to a signal RP of a target transmitting terminal.

15. The terminal according to claim 11, wherein the first CSI comprises at least one of the following items:

a channel quality indicator (CQI) of the first receiving terminal in the H1 frequency domain units, or an interference to signal ratio (ISR) that is received in the h frequency domain units and that is of an interference received power (RP) of the first transmitting terminal to a signal RP of a target transmitting terminal.

16. The terminal according to claim 11, wherein the first CSI comprises at least one of the following items:

a signal to interference plus noise ratio (SINR) of the first receiving terminal in the H1 frequency domain units, an interference received power (RP) that is of the first transmitting terminal and that is received in the h frequency domain units, or a signal RP that is of a target transmitting terminal and that is received in the H1 frequency domain units.

17. The terminal according to claim 11, wherein the first CSI comprises at least one of the following items:

a channel quality indicator (CQI) of the first receiving terminal in the H1 frequency domain units, an interference received power (RP) that is of the first transmitting terminal and that is received in the h frequency domain units, or a signal RP that is of a target transmitting terminal and that is received in the H1 frequency domain units.

18. A non-transitory computer storage medium comprising computer instructions stored thereon, wherein when the computer instructions are run on an electronic device, the electronic device is enabled to:

send a first channel state information-reference signal (CSI-RS) in N frequency domain units, wherein N is a positive integer;

detect channel state information (CSI) received from K receiving terminals by:

detecting second indication information received from a jth receiving terminal in the K receiving terminals, wherein the second indication information indicates that the jth receiving terminal has reported a CSI, and j is a positive integer less than or equal to K, and detecting a first CSI from data received from the jth receiving terminal based on the second indication information, wherein the CSI received from the K receiving terminals is determined based on the first CSI-RS, and K is greater than or equal to 2;

update transmit powers in the N frequency domain units based on all or some of the CSI received from the K receiving terminals; and send user data based on the updated transmit powers in the N frequency domain units.

19. The non-transitory computer storage medium according to claim 18, wherein sending the user data based on the updated transmit powers in the N frequency domain units comprises:

when the updated transmit powers of F frequency domain units in the N frequency domain units are greater than a preset threshold, sending the user data in at least one of the F frequency domain units, wherein:

F is less than or equal to N and N is greater than or equal to two, or

F is equal to N and N is equal to one.

20. The non-transitory computer storage medium according to claim 18, wherein sending the first CSI-RS in the N frequency domain units comprises:

sending first indication information and the first CSI-RS in the N frequency domain units, wherein the first indication information indicates a time-frequency resource location of the first CSI-RS; or sending the first CSI-RS in the N frequency domain units according to a predefined rule, wherein the predefined rule indicates the time-frequency resource location of the first CSI-RS.

* * * * *